(12) United States Patent
Lee et al.

(10) Patent No.: US 9,055,289 B2
(45) Date of Patent: Jun. 9, 2015

(54) 3D DISPLAY SYSTEM

(75) Inventors: Ho Dong Lee, Seoul (KR); Min Chul Park, Seoul (KR); Yeong Seon Choe, Seoul (KR); Jung Gyn Cho, Gyeonggi-Do (KR); Sung Jin Cho, Seoul (KR); Ki Hyuk Kim, Seongnam-Si (KR); Hyeon Na Han, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 431 days.

(21) Appl. No.: 13/426,919

(22) Filed: Mar. 22, 2012

(65) Prior Publication Data
US 2013/0127832 A1 May 23, 2013

(30) Foreign Application Priority Data

Nov. 23, 2011 (KR) .................. 10-2011-0122785
Jan. 31, 2012 (KR) .................. 10-2012-0009553

(51) Int. Cl.
*H04N 13/04* (2006.01)
*H04N 13/02* (2006.01)

(52) U.S. Cl.
CPC ....... *H04N 13/0477* (2013.01); *H04N 13/0404* (2013.01); *H04N 13/0409* (2013.01); *H04N 13/0468* (2013.01); *H04N 13/0475* (2013.01); *H04N 13/0481* (2013.01); *H04N 13/0207* (2013.01); *H04N 2213/002* (2013.01)

(58) Field of Classification Search
CPC .......... H04N 13/0207; H04N 13/0404; H04N 13/0409; H04N 13/0468; H04N 13/0475; H04N 13/0477; H04N 13/0481; H04N 2213/002

USPC .......................................................... 348/51
See application file for complete search history.

(56) References Cited

U.S. PATENT DOCUMENTS

| | | | | |
|---|---|---|---|---|
| 4,429,328 A | * | 1/1984 | Jones et al. ..................... | 348/47 |
| 4,670,744 A | * | 6/1987 | Buzak .............................. | 345/6 |
| 5,125,074 A | * | 6/1992 | Labeaute et al. .............. | 345/421 |
| 5,249,264 A | * | 9/1993 | Matsumoto ................... | 345/624 |
| 5,425,136 A | * | 6/1995 | Lo et al. ........................ | 345/427 |

(Continued)

FOREIGN PATENT DOCUMENTS

| | | |
|---|---|---|
| CN | 102033324 A | 4/2011 |
| CN | 102056003 A | 5/2011 |

(Continued)

OTHER PUBLICATIONS

Yi et al, Moving Parallax Barrier Design for Eye-Tracking Autostereoscopic Displays, 2008.*

(Continued)

*Primary Examiner* — Shan Elahi
(74) *Attorney, Agent, or Firm* — NSIP Law

(57) ABSTRACT

Provided is a three-dimensional (3D) display system. The 3D display system synthesizes a 3D image and position information data of an observer obtained through a camera with an optimal viewing area image with respect to horizontal and vertical directions of a display panel in a 3D space, and displays the synthesized image on the display panel such that the observer can visually know an optimal viewing area. Accordingly, the 3D display system enables the observer to visually check the optimal viewing area with ease and induces the observer to move to a position in the optimal viewing area.

20 Claims, 14 Drawing Sheets

(56) References Cited

U.S. PATENT DOCUMENTS

| | | | |
|---|---|---|---|
| 5,777,720 A * | 7/1998 | Shapiro et al. | 351/237 |
| 5,945,965 A * | 8/1999 | Inoguchi et al. | 345/6 |
| 6,172,807 B1 * | 1/2001 | Akamatsu | 359/462 |
| 6,368,276 B1 * | 4/2002 | Bullis | 600/437 |
| 7,277,599 B2 * | 10/2007 | Eian et al. | 382/285 |
| 8,154,686 B2 * | 4/2012 | Mather et al. | 349/65 |
| 8,212,811 B2 * | 7/2012 | Vartanian | 345/419 |
| 8,675,042 B2 * | 3/2014 | Shimaya | 348/36 |
| 8,704,878 B2 * | 4/2014 | Hasegawa et al. | 348/51 |
| 8,773,508 B2 * | 7/2014 | Daniel et al. | 348/46 |
| 2002/0015019 A1 * | 2/2002 | Kinjo | 345/156 |
| 2002/0072883 A1 * | 6/2002 | Lim et al. | 703/2 |
| 2002/0081020 A1 * | 6/2002 | Shimazu | 382/154 |
| 2003/0026474 A1 * | 2/2003 | Yano | 382/154 |
| 2004/0119896 A1 * | 6/2004 | Kean et al. | 349/25 |
| 2004/0169920 A1 * | 9/2004 | Uehara et al. | 359/443 |
| 2004/0218245 A1 * | 11/2004 | Kean et al. | 359/232 |
| 2005/0104801 A1 * | 5/2005 | Sugiura | 345/5 |
| 2005/0231590 A1 * | 10/2005 | Iwasaki | 348/47 |
| 2005/0248561 A1 * | 11/2005 | Ito et al. | 345/419 |
| 2006/0170644 A1 * | 8/2006 | Ioki et al. | 345/102 |
| 2008/0043092 A1 * | 2/2008 | Evans et al. | 348/36 |
| 2009/0040426 A1 * | 2/2009 | Mather et al. | 349/65 |
| 2010/0321477 A1 * | 12/2010 | Iwasaki | 348/49 |
| 2011/0025828 A1 * | 2/2011 | Ishiyama | 348/47 |
| 2011/0069151 A1 * | 3/2011 | Orimoto | 348/42 |
| 2011/0109964 A1 * | 5/2011 | Kim et al. | 359/463 |
| 2011/0242103 A1 * | 10/2011 | Han et al. | 345/419 |
| 2012/0050857 A1 * | 3/2012 | Lee et al. | 359/464 |
| 2012/0076399 A1 * | 3/2012 | Yamaji et al. | 382/154 |
| 2012/0092466 A1 | 4/2012 | Choi | |
| 2012/0182407 A1 * | 7/2012 | Yoshida | 348/54 |

FOREIGN PATENT DOCUMENTS

| | | | |
|---|---|---|---|
| EP | 0769881 A2 | 4/1997 | |
| EP | 2320668 A2 * | 5/2011 | H04N 13/00 |
| WO | WO 2010/147281 A1 | 12/2010 | |

OTHER PUBLICATIONS

European Search Report issued Apr. 9, 2013 in counterpart European Patent Application No. 12161294.9. (11 pages in English).

Chinese Office Action issued Jul. 2, 2014 in counterpart Chinese Patent Application No. 20120141362.3 (11 pages, in Chinese with English Translation).

* cited by examiner

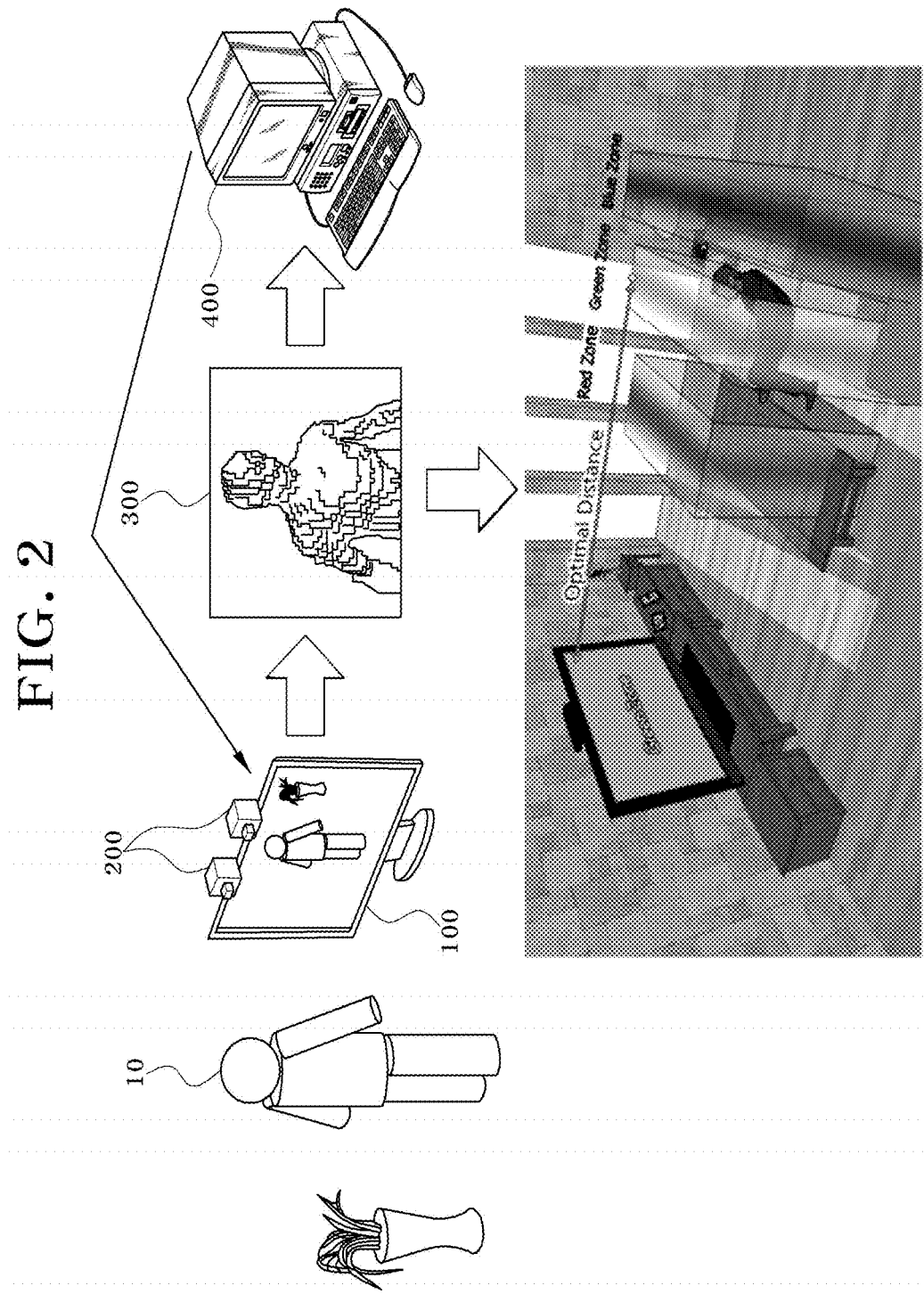

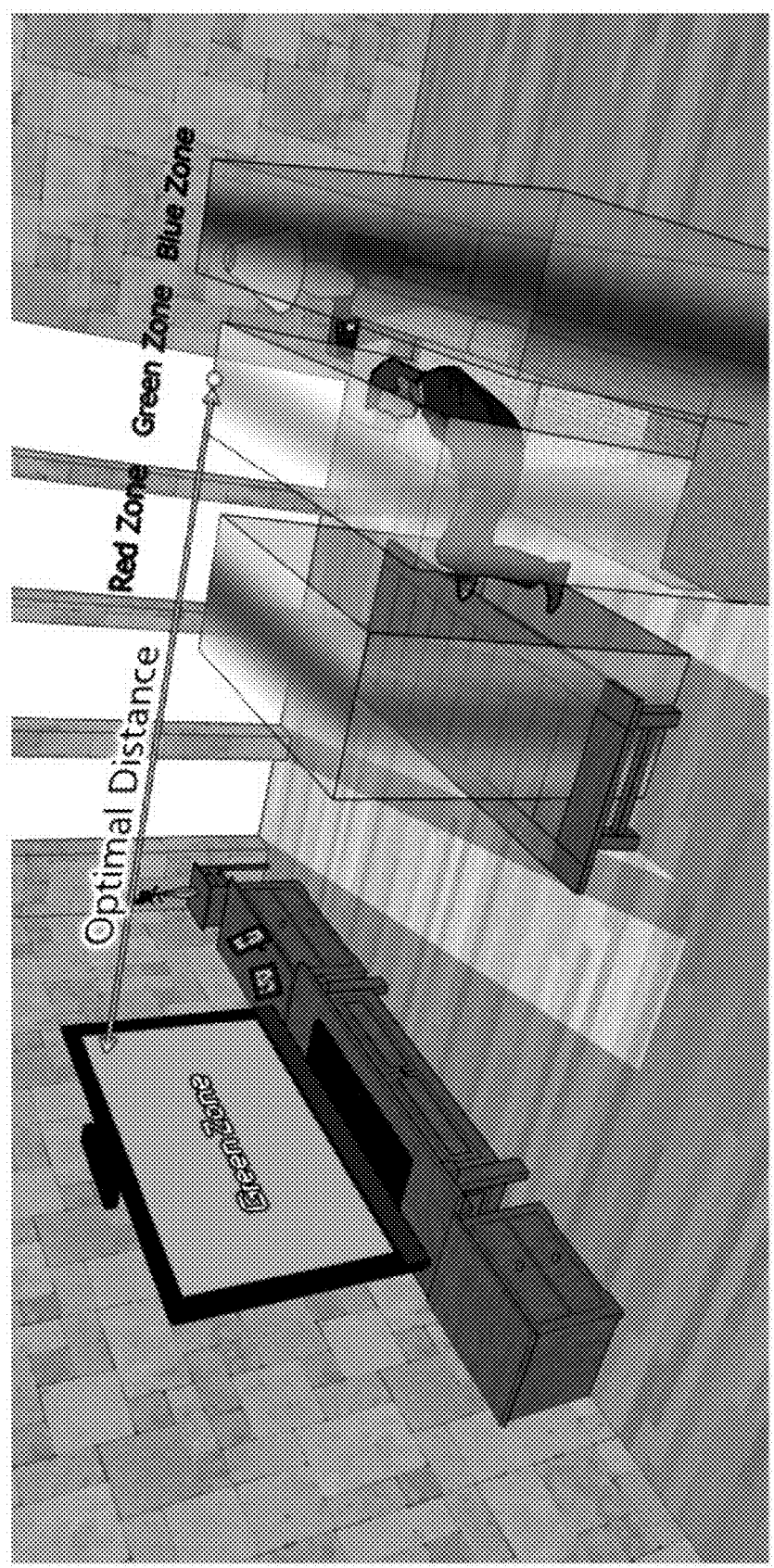

3D DISPLAY SYSTEM

CROSS-REFERENCE TO RELATED APPLICATION

This application claims priorities to and the benefit of Korean Patent Applications No. 2011-0122785 filed on Nov. 23, 2011 and 2012-0009553 filed on Jan. 31, 2012 the disclosure of which is incorporated herein by reference in its entirety.

BACKGROUND

1. Field of the Invention

The present invention relates to a three-dimensional (3D) display system, and more particularly, to a 3D display system that synthesizes a 3D image and position information data of an observer obtained through a camera with an optimal viewing area image with respect to horizontal and vertical directions of a display panel in a 3D space, and displays the synthesized image on the display panel to let the observer visually know an optimal viewing area, thereby enabling the at least one observer to visually check the optimal viewing area with ease and inducing the observer to move to a position in the optimal viewing area.

2. Discussion of Related Art

In general, a stereo image representing three dimensions is obtained according to the principle of stereo vision. Here, parallax between two eyes, that is, binocular disparity caused by a distance of about 65 mm between two eyes, is the most crucial factor to experiencing stereoscopy.

Specifically, the left and right eyes see different 2D images, which are delivered to the brain through the retinas. Then, the brain fuses the 2D images together, thereby reproducing depth and actuality of the original 3D image.

Technology that has been hitherto disclosed to display 3D images includes stereo image display methods with special glasses, stereo image display methods without glasses, and holographic display methods.

Among these methods, the stereo image display methods with special glasses may be classified into a polarized-glass method that utilizes a vibration direction or rotation direction of polarized light, a shutter glass method in which left and right images are alternately displayed, and a Pulfrich method in which types of light having different brightness are delivered to each of the left and right eyes.

Also, the stereo image display methods without glasses may be classified into a parallax method that enables separate observation of respective images corresponding to the left and right eyes through apertures having a vertical lattice shape in front of the images, a lenticular method that utilizes a lenticular plate on which semicylindrical lenses are arranged, and an integral photography method that utilizes a fly's eye lens sheet.

The holographic display methods may yield 3D images having all factors of a stereoscopic feeling such as accommodation, convergence, binocular disparity, and motion parallax, which are classified into laser reproduction holograms and white-light reproduction holograms.

The stereo image display methods with special glasses enable many people to enjoy stereo images but require them to wear polarized glasses or liquid crystal shutter glasses. In other words, observers need to wear special glasses and thus feel uncomfortable and unnatural.

Meanwhile, the stereo image display methods without glasses have a fixed observing range for a small number of people, but are preferred because they enable observation without special glasses. In other words, observers directly view a screen, and thus the above-mentioned drawback is eliminated. For this reason, active research is under way on the stereo image display methods without glasses.

Perfect 3D images can be displayed using, for example, the holographic display methods, which directly display images based on 3D coordinates in a space using a laser, lens, mirror, and so on. The holographic display methods give the feeling of an actually existing object. However, due to technological difficulties and a large space occupied by equipment, the holographic display methods are difficult to use.

Consequently, there is a growing tendency to employ stereoscopic display methods that provide the amount of parallax of each object through a stereo image and thereby cause an observer to feel the depth of the object. In stereoscopic displaying, viewing zone-forming optical system for stereo vision is used. Typical viewing zone-forming optical system utilizes a parallax barrier method that forms a viewing zone of each view image using a barrier, and a lenticular lens sheet method that forms a viewing zone of each view image using the light-collecting effect of a cylindrical lens. The two methods are primarily aimed at the function of forming a viewing zone of the corresponding view image. In the two methods, respective view images have the same center, and the two methods can be selectively used according to characteristics of systems.

In the parallax barrier method, vertical or horizontal apertures or slits are put in front of an image corresponding to both the left and right eyes, and the synthesized stereo image is separately viewed through the apertures or slits, thereby giving a stereoscopic feeling.

A 3D image display apparatus employing the parallax barrier method will be briefly described below.

FIG. 1 illustrates implementation of a 3D image performed by an existing parallax-barrier 3D display apparatus.

Referring to FIG. 1, in the existing parallax barrier method, a parallax barrier panel 20 formed by repeatedly arranging an aperture through which light emitted from a display panel 30 is transmitted and a barrier that blocks the light is repeatedly disposed in front of the display panel 30.

An observer 10 sees an image displayed or printed on the display panel 30 through the apertures of the parallax barrier panel 20. At this time, a left eye L and a right eye R of the observer 10 see different regions of the display panel 30 even through the same aperture. In the parallax barrier method using such a principle, left and right eyes see images corresponding to pixels of different regions, such that stereoscopy can be experienced. Specifically, in FIG. 1, the left eye L sees a left eye-corresponding pixel Lp in the display panel 30, and the right eye R sees a right eye-corresponding pixel Rp in the display panel 30.

Also, the lenticular lens method biases view image information by the refractive power of lenslets using a lenticular lens sheet instead of a parallax barrier, and thereby can form the same viewing zone for each view image as in an environment in which a parallax barrier is used. In other words, on the basis of the same mechanism, both the methods divide view information to provide a stereoscopic effect.

However, by causing both eyes to separately see an image, a 3D display apparatus based on the existing parallax barrier method or lenticular lens method gives a stereoscopic feeling to a predetermined position only. Outside the predetermined position, left and right images are inverted or the image is inappropriately separated in the left and right directions, and thus a distorted 3D image is observed.

SUMMARY OF THE INVENTION

The present invention is directed to a three dimensional (3D) display system that synthesizes a 3D image and position information data of an observer obtained through a camera with an optimal viewing area image with respect to horizontal and vertical directions of a display panel in a 3D space, and displays the synthesized image on the display panel to let the observer visually know an optimal viewing area, thereby enabling the at least one observer to visually check the optimal viewing area with ease and inducing the observer to move to a position in the optimal viewing area. Such a 3D display system can be implemented for a single observer or multiple observers.

According to an aspect of the present invention, there is provided a 3D display system including: a glassesless-type 3D image display in which a parallax barrier including apertures is disposed in front of a display panel; a camera configured to obtain background image information on an actual observing area including at least one observer present in front of the 3D image display; a 3D image obtainer configured to receive the obtained background image information from the camera and obtain a 3D image and position information data of the observer using stereo matching; and a controller configured to calculate an extended intensity distribution of light emitted from respective light sources of the glassesless-type 3D image display and reaching respective views in an observing area extended in an x direction of a horizontal axis and in a z direction of a vertical axis with respect to an observing plane, obtain intensity distribution data in horizontal and vertical observing ranges from the predetermined observing plane, also obtain an optimal viewing area image having quantities of light according to respective views in horizontal and vertical directions of the display panel using the intensity distribution data, synthesize the 3D image and position information data of the observer obtained from the 3D image obtainer with the optimal viewing area image, and display the synthesized image on the display panel such that the observer can visually know an optimal viewing area.

Here, the extended intensity distribution may be calculated using Equation 1 below.

$$\text{Extended intensity distribution} = \sum_{add^-}^{add^+} \sum_n \sum_{OV_{min}}^{OV_{max}} \{X_{P(x)}, I_{P(x)}\} \quad \text{[Equation 1]}$$

Here, $$n(\sum_n)$$

denotes a repetition row accumulated beginning with 1 and ending with the number of all views, $OV_{min}$ and $OV_{max}$ denote the minimum and maximum of an observing range in the x direction of the horizontal axis, P(x) denotes a position of a point light source of an infinitesimal area constituting a unit pixel and is represented as a coordinate in the x direction of the horizontal axis, $X_{P(x)}$ denotes a position (viewing zone coordinates) of P(x) reaching the observing plane, $I_{P(x)}$ denotes brightness of light reaching the viewing zone coordinates on the observing plane, rays emitted from P(x) correspond to the viewing zone coordinates $X_{P(x)}$ for forming a viewing zone and the brightness $I_{P(x)}$ of $X_{P(x)}$ at a distance (V+d) from the display panel to the observing plane, and add+ and add− denote extended areas in z+ and z− directions of the vertical axis with respect to the observing plane (V+d).

Preferably, the viewing zone coordinates $X_{P(x)}$ and the brightness $I_{P(x)}$ of $X_{P(x)}$ may be calculated using Equation 2 below.

$$X_{P(x)} = \frac{(V+d)(A-P(x))}{d} - P(x) \quad \text{[Equation 2]}$$

$$I_{P(x)} = L \frac{(P(x)) \cdot \cos^2\left[\tan^{-1}\left[\frac{X_{P(x)}}{V+d}\right]\right]}{(V+d)^2 + X_{P(x)}^2}$$

Here, V denotes a viewing distance between the parallax barrier and the observing plane, d denotes a distance between the parallax barrier and the display panel, A denotes an aperture width of the parallax barrier, and L denotes an initial brightness value of the point light source.

According to another aspect of the present invention, there is provided a 3D display system including: a glassesless-type 3D image display in which a lenticular lens sheet formed by arranging lenticular lenses in the form of an array is disposed in front of a display panel; a camera configured to obtain background image information on an actual observing area including at least one observer present in front of the 3D image display; a 3D image obtainer configured to receive the obtained background image information from the camera and obtain a 3D image and position information data of the observer using stereo matching; and a controller configured to calculate an extended intensity distribution of light emitted from respective light sources of the glassesless-type 3D image display and reaching respective views in an observing area extended in an x direction of a horizontal axis and in a z direction of a vertical axis with respect to an observing plane, obtain intensity distribution data in horizontal and vertical observing ranges from the observing plane, also obtain an optimal viewing area image having quantities of light according to respective views in horizontal and vertical directions of the display panel using the intensity distribution data, synthesize the 3D image and position information data of the observer obtained from the 3D image obtainer with the optimal viewing area image, and display the synthesized image on the display panel such that the observer can visually know an optimal viewing area.

Here, the extended intensity distribution may be calculated using Equation 3 below.

$$\text{Extended intensity distribution} = \sum_{add^-}^{add^+} \sum_n \sum_{OV_{min}}^{OV_{max}} \{X_{P(x)}, I_{P(x)}\} \quad \text{[Equation 3]}$$

Here, $$n(\sum_n)$$

denotes a repetition row accumulated beginning with 1 and ending with the number of all views, $OV_{min}$ and $OV_{max}$ denote the minimum and maximum of an observing range in the x direction of the horizontal axis, P(x) denotes a position of a point light source of an infinitesimal area constituting a unit pixel and is represented as a coordinate in the x direction of the horizontal axis, $X_{P(x)}$ denotes a position (viewing zone coordinates) of P(x) reaching the observing plane, $I_{P(x)}$ denotes brightness of light reaching the viewing zone coordinates on the observing plane, rays emitted from P(x) correspond to the viewing zone coordinates $X_{P(x)}$ for forming a viewing zone and the brightness $I_{P(x)}$ of $X_{P(x)}$ at a distance (V+d) from the display panel to the observing plane, and add+ and add− denote extended areas in z+ and z− directions of the vertical axis with respect to the observing plane (V+d).

Preferably, the viewing zone coordinates $X_{P(x)}$ and the brightness $I_{P(x)}$ of $X_{P(x)}$ may be calculated using Equation 4 below.

$$X_{P(x)} = \frac{(V+d)(A-P(x))}{d} - P(x) \quad \text{[Equation 4]}$$

$$I_{P(x)} = L \frac{(P(x)) \cdot \cos^2\left[\tan^{-1}\left[\frac{X_{P(x)}}{V+d}\right]\right]}{(V+d)^2 + X_{P(x)}^2}$$

Here, V denotes a viewing distance between the lenticular lens sheet and the observing plane, d denotes a distance between the lenticular lens sheet and the display panel, A denotes a width of each semicylindrical lenticular lens of the lenticular lens sheet, and L denotes an initial brightness value of the point light source.

Preferably, when the 3D position information data of the observer obtained from the 3D image obtainer does not correspond to the optimal viewing area, the controller may control the display panel to display optimal view position guide information such that the observer can move to a position in the optimal viewing area.

Preferably, when it is determined using the 3D position information data of the observer obtained from the 3D image obtainer that the observer has left a central area of the display panel, the controller may rotate the glassesless-type 3D image display or the camera using a rotation means such that the observer can reenter the central area of the display panel. Preferably, there observer may be a plurality of observers.

According to still another aspect of the present invention, there is provided a 3D display system including: a glassesless-type 3D image display in which a parallax barrier including apertures is disposed in front of a display panel; an observer position tracking system configured to determine a position of at least one observer present in front of the 3D image display and deliver position information data of the observer to a controller; and the controller configured to calculate an extended intensity distribution of light emitted from respective light sources of the glassesless-type 3D image display and reaching respective views in an observing area extended in an x direction of a horizontal axis and in a z direction of a vertical axis with respect to an observing plane, obtain intensity distribution data in horizontal and vertical observing ranges from the predetermined observing plane, also obtain an optimal viewing area image having quantities of light according to respective views in horizontal and vertical directions of the display panel using the intensity distribution data, synthesize the position information data of the observer received from the observer position tracking system with the optimal viewing area image, and display the synthesized image on the display panel such that the observer can visually know an optimal viewing area.

Preferably, the extended intensity distribution may be calculated using Equation 5 below.

$$\text{Extended intensity distribution} = \quad \text{[Equation 5]}$$

$$\sum_{add^-}^{add^+} \sum_{n} \sum_{OV_{min}}^{OV_{max}} \{X_{P(x)}, I_{P(x)}\}$$

Here, $$n\left(\sum_{n}\right)$$

denotes a repetition row accumulated beginning with 1 and ending with the number of all views, $OV_{min}$ and $OV_{max}$ denote the minimum and maximum of an observing range in the x direction of the horizontal axis, P(x) denotes a position of a point light source of an infinitesimal area constituting a unit pixel and is represented as a coordinate in the x direction of the horizontal axis, $X_{P(x)}$ denotes a position (viewing zone coordinates) of P(x) reaching the observing plane, $I_{P(x)}$ denotes brightness of light reaching the viewing zone coordinates on the observing plane, rays emitted from P(x) correspond to the viewing zone coordinates $X_{P(x)}$ for forming a viewing zone and the brightness $I_{P(x)}$ of $X_{P(x)}$ at a distance (V+d) from the display panel to the observing plane, and add+ and add− denote extended areas in z+ and z− directions of the vertical axis with respect to the observing plane (V+d).

Preferably, the viewing zone coordinates $X_{P(x)}$ and the brightness $I_{P(x)}$ of $X_{P(x)}$ may be calculated using Equation 6 below.

$$X_{P(x)} = \frac{(V+d)(A-P(x))}{d} - P(x) \quad \text{[Equation 6]}$$

$$I_{P(x)} = L \frac{(P(x)) \cdot \cos^2\left[\tan^{-1}\left[\frac{X_{P(x)}}{V+d}\right]\right]}{(V+d)^2 + X_{P(x)}^2}$$

Here, V denotes a viewing distance between the parallax barrier and the observing plane, d denotes a distance between the parallax barrier and the display panel, A denotes an aperture width of the parallax barrier, and L denotes an initial brightness value of the point light source.

According to yet another aspect of the present invention, there is provided a 3D display system including: a glassesless-type 3D image display in which a lenticular lens sheet formed by arranging lenticular lenses in the form of an array is disposed in front of a display panel; an observer position tracking system configured to determine a position of at least one observer present in front of the 3D image display and deliver position information data of the observer to a controller; and the controller configured to calculate an extended intensity distribution of light emitted from respective light sources of the glassesless-type 3D image display and reaching respective views in an observing area extended in an x direction of a horizontal axis and in a z direction of a vertical axis with respect to an observing plane, obtain intensity distribution data in horizontal and vertical observing ranges from the observing plane, also obtain an optimal viewing area image having quantities of light according to respective views in horizontal and vertical directions of the display panel using the intensity distribution data, synthesize the position information data of the observer received from the observer position tracking system with the optimal viewing area image, and display the synthesized image on the display panel such that the observer can visually know an optimal viewing area.

Preferably, the extended intensity distribution may be calculated using Equation 7 below.

Extended intensity distribution = [Equation 7]

$$\sum_{add^-}^{add^+} \sum_n \sum_{OV_{min}}^{OV_{max}} \{X_{P(x)}, I_{P(x)}\}$$

Here, $$n(\sum_n)$$

denotes a repetition row accumulated beginning with 1 and ending with the number of all views, $OV_{min}$ and $OV_{max}$ denote the minimum and maximum of an observing range in the x direction of the horizontal axis, P(x) denotes a position of a point light source of an infinitesimal area constituting a unit pixel and is represented as a coordinate in the x direction of the horizontal axis, $X_{P(x)}$ denotes a position (viewing zone coordinates) of P(x) reaching the observing plane, $I_{P(x)}$ denotes brightness of light reaching the viewing zone coordinates on the observing plane, rays emitted from P(x) correspond to the viewing zone coordinates $X_{P(x)}$ for forming a viewing zone and the brightness $I_{P(x)}$ of $X_{P(x)}$ at a distance (V+d) from the display panel to the observing plane, and add+ and add− denote extended areas in z+ and z− directions of the vertical axis with respect to the observing plane (V+d).

Preferably, the viewing zone coordinates $X_{P(x)}$ and the brightness $I_{P(x)}$ of $X_{P(x)}$ may be calculated using Equation 8 below.

$$X_{P(x)} = \frac{(V+d)(A-P(x))}{d} - P(x) \quad \text{[Equation 8]}$$

$$I_{P(x)} = L \frac{(P(x)) \cdot \cos^2\left[\tan^{-1}\left[\frac{X_{P(x)}}{V+d}\right]\right]}{(V+d)^2 + X_{P(x)}^2}$$

Here, V denotes a viewing distance between the lenticular lens sheet and the observing plane, d denotes a distance between the lenticular lens sheet and the display panel, A denotes a width of each semicylindrical lenticular lens of the lenticular lens sheet, and L denotes an initial brightness value of the point light source.

Preferably, when the position information data of the observer obtained from the observer position tracking system does not correspond to the optimal viewing area, the controller may control the display panel to display optimal view position guide information such that the observer can move to a position in the optimal viewing area.

Preferably, when it is determined using the position information data of the observer obtained from the observer position tracking system that the observer has left a central area of the display panel, the controller may rotate the glassesless-type 3D image display using a rotation means such that the observer can reenter the central area of the display panel. Preferably, the observer may be plural in number.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 2 schematically illustrates a 3D display system according to an exemplary embodiment of the present invention;

FIGS. 9A to 9C show examples in which a 3D display system according to an exemplary embodiment of the present invention divides an obtained viewing area into color areas in a z direction of a vertical axis and displays the corresponding areas to observers.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
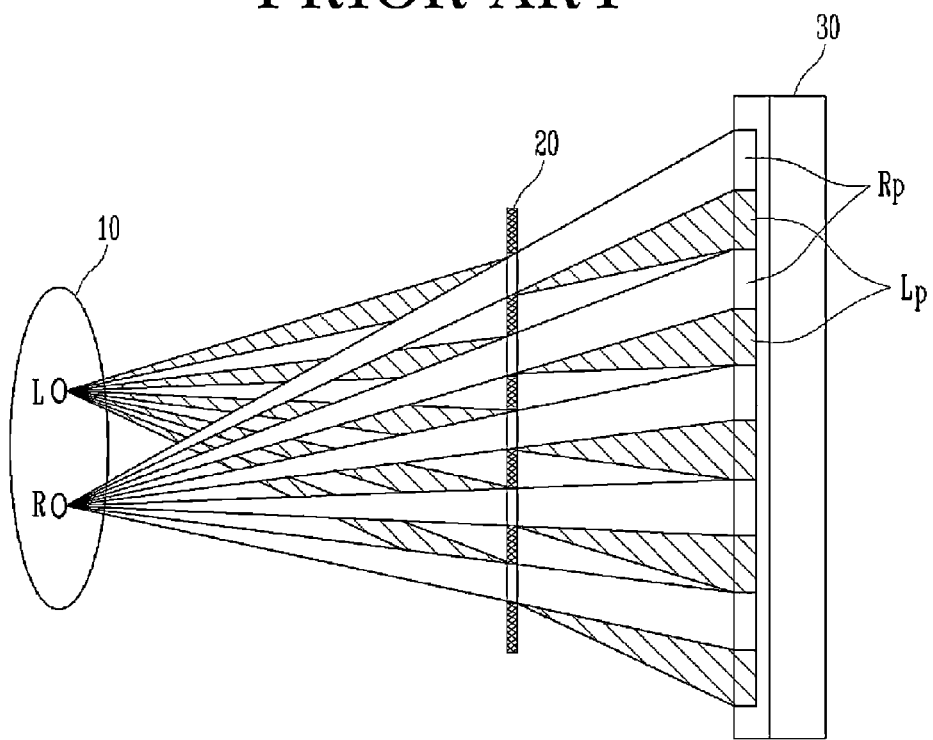
FIG. 1 illustrates implementation of a three-dimensional (3D) image performed by an existing parallax-barrier 3D image display apparatus.
Figure 3A:
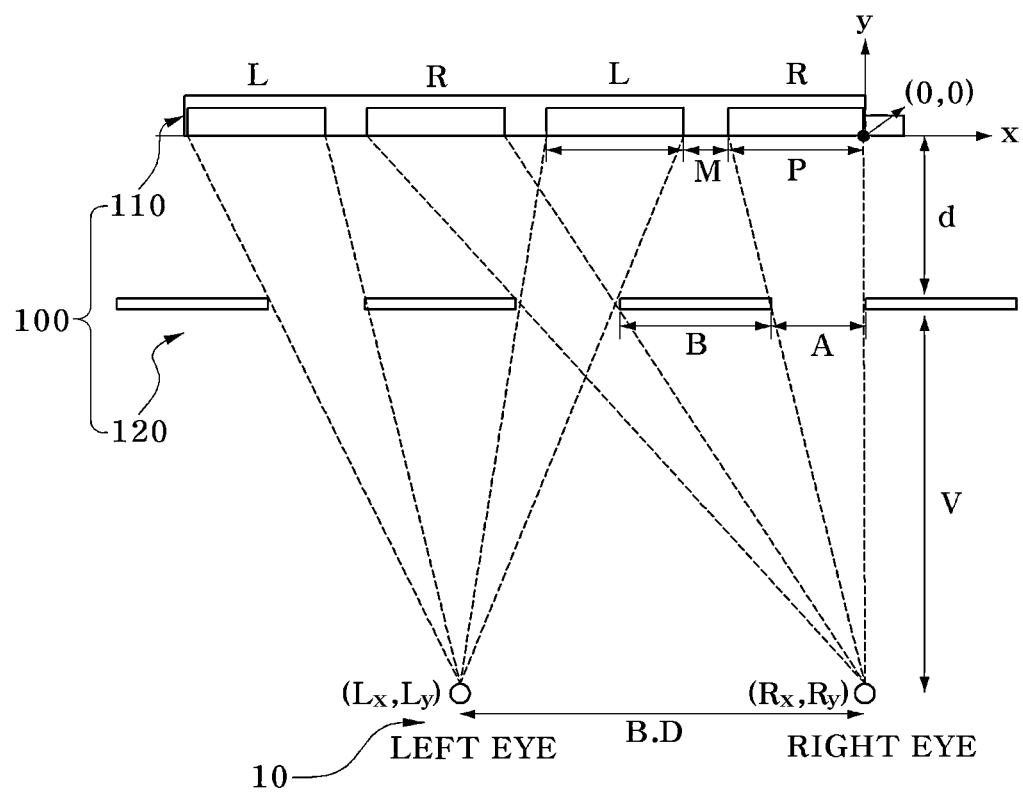
FIGS. 3A and 3B illustrate a principle of implementing a 3D image using a 3D display system according to an exemplary embodiment of the present invention.
Figure 3B:
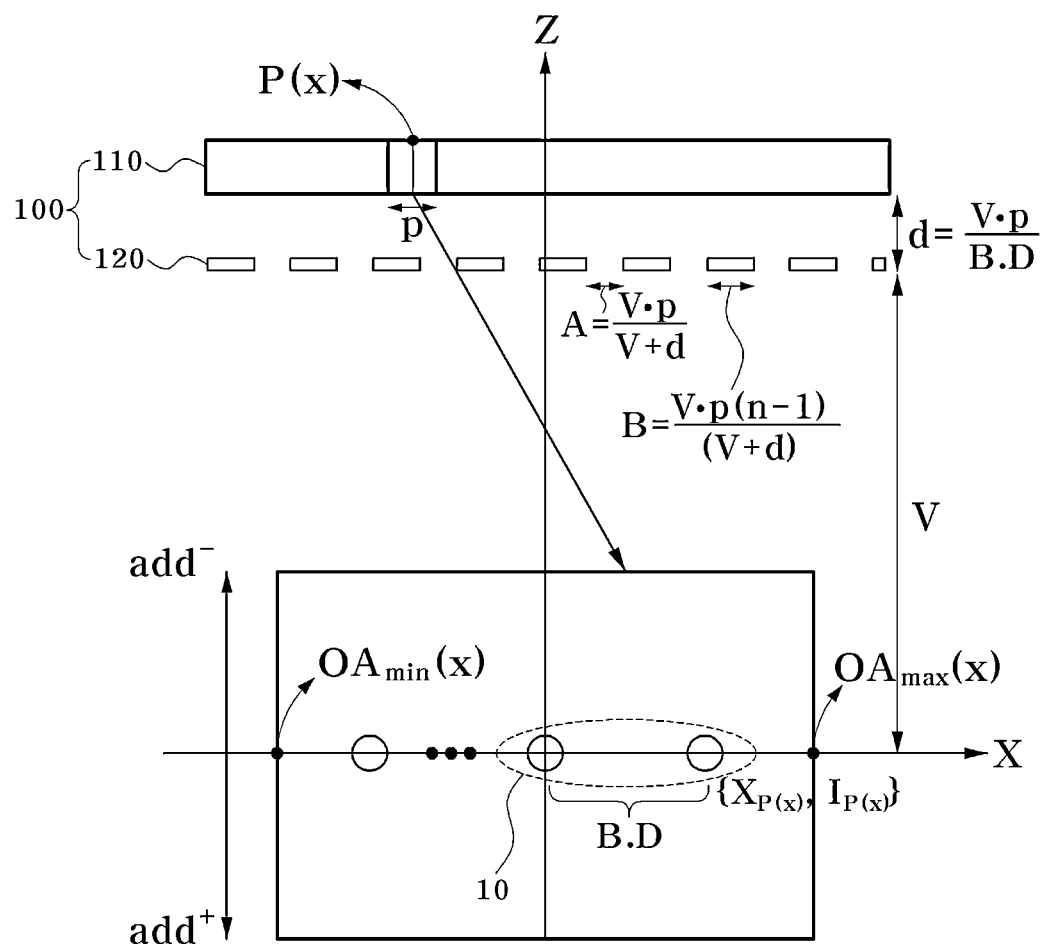

FIG. 2 schematically illustrates a three-dimensional (3D) display system according to an exemplary embodiment of the present invention, and FIGS. 3A and 3B illustrate a principle of implementing a 3D image using a 3D display system according to an exemplary embodiment of the present invention.

Referring to FIG. 2, a 3D display system according to an exemplary embodiment of the present invention generally includes a glassesless-type 3D image display 100, a camera 200, a 3D image obtainer 300, a controller 400, and so on. The glassesless-type 3D image display 100 is a glassesless-type stereo image display employing a common parallax barrier method. In the glassesless-type 3D image display 100, a parallax barrier 120 has slit-shaped apertures arranged in a vertical or horizontal direction with respect to one surface of a display panel 110, on which image information for left and right eyes is displayed, and blocks an image to be incident to the left eye for the right eye and an image to be incident to the right eye for the left eye, such that a user can ultimately see a 3D image using binocular disparity. The glassesless-type 3D image display is also referred as an autostereoscopic display.

Specifically, the parallax barrier 120 formed by repeatedly arranging an aperture through which light emitted from the display panel 110 is transmitted and a barrier that blocks the light is disposed in front of the display panel 110. Thus, an observer 10 can enjoy a 3D image from the 3D image display 100 through the parallax barrier 120 without glasses. In the case of a lenticular lens method, light emitted from the display panel 110 passes through the center of lenslets successively arranged at the same interval in a lenticular lens sheet and forms a viewing zone for each view on an observing plane. Here, the center of the viewing zone may be designed and applied to have the same characteristics as the case where the parallax barrier 120 is used.

The display panel 110 is a module having an image display means, such as a liquid crystal display (LCD), a light-emitting diode (LED) display, an organic light-emitting diode (OLED) display, or a plasma display panel (PDP), capable of displaying an input image signal, and displays two-dimensional (2D) image of the input image signal.

Also, in the display panel 110, a left-eye pixel for displaying left-eye image information and a right-eye pixel for displaying right-eye image information may be alternately formed.

In the parallax barrier 120, for example, vertical barriers are prepared at predetermined intervals to block light emitted from the right-eye pixel and the left-eye pixel, and apertures between the barriers pass the light emitted from the right-eye pixel and the left-eye pixel, such that the observer 10 can see a virtual 3D image.

More specifically, in a method of implementing a 3D image using the parallax barrier 120, rays of light directed to the left eye of the observer 10 among rays of light emitted from a backlight unit (not shown) of the display panel 110 pass through left-eye pixels of the display panel 110 and apertures of the parallax barrier 120 and then reach the left eye of the observer 10. However, among the rays of light emitted from the backlight unit of the display panel 110, rays of light directed to the right eye of the observer 10 are blocked by a barrier and cannot be delivered to the observer 10 even if they pass through left-eye pixels of the display panel 110. Likewise, among the rays of light emitted from the backlight unit of the display panel 110, some rays of light pass through right-eye pixels of the display panel 110 and apertures of the parallax barrier 120 and then reach the right eye of the observer 10, and the rays of light directed to the left eye of the observer 10 are blocked by a barrier even if they pass through the right-eye pixels of the display panel 110.

Thus, the rays of light passing through the left-eye pixels are only delivered to the left eye of the observer 10, and the rays of light passing through the right-eye pixels are only delivered to the right eye of the observer 10, such that the observer 10 can recognize the light. Between the light reaching the left eye and the light reaching the right eye, there is sufficient parallax to be sensed by a human, that is, the observer 10, such that the observer 10 can enjoy 3D images.

Meanwhile, to implement a 3D image, a common lenticular lens sheet (not shown) may be used instead of the parallax barrier 120 employed in an exemplary embodiment of the present invention.

Specifically, as an optical member for forming a plurality of point light sources into at least one line light source, the lenticular lens sheet is disposed apart from the display panel 110 by a predetermined distance, like the parallax barrier 120. For example, one surface (or incidence surface) of the lenticular lens sheet may be disposed apart from the plurality of point light sources formed on the display panel 120 by the predetermined distance, and a plurality of semicylindrical (or cylindrical) lenticular lenses may be formed and arranged in the form of an array on the other surface (or emission surface) of the lenticular lens sheet. Alternatively, lenticular lenses may be formed on the one side (or incidence surface).

By the respective semicylindrical lenses of the lenticular lens sheet, a line light source parallel to a length direction (i.e., a semicylindrical direction) of the respective semicylindrical lenses may be formed at a position (i.e., a position at which collected light is focused) spaced apart from the lenticular lens sheet by the predetermined distance.

In FIG. 2, the camera 200 may be embedded in the glassesless-type 3D image display 100, and serves to obtain background image information on an actual observing area including the observer 10 present in front of the display panel 110.

The camera 200 may be a stereo camera capable of obtaining 3D coordinate data per pixel of the obtained image. The camera 200 may define the actual observing area as a 3D space, such that 3D coordinate data of an object in the actual observing area can be obtained. Meanwhile, in another exemplary embodiment of the present invention, any device such as a depth camera, an infrared camera, and a laser scanner may be used instead of a stereo camera as long as it is capable of obtaining 3D coordinate data of an object.

The 3D image obtainer 300 serves to receive the obtained background image information from the camera 200 and obtain the 3D image and position information data of the observer 10 using stereo matching.

Here, stereo matching is an image processing technique of appropriately matching two images obtained at different positions and obtaining parallax amount information on an object included in the images. Stereo matching is more effective than measuring a distance as a function of travel time and speed of light using an ultrasonic wave and laser as light sources, and is under fewer restraints on actual application environments. For these reasons, stereo matching is widely used in a variety of fields.

In another exemplary embodiment, the camera 200 and the 3D image obtainer 300 may be implemented as an observer position tracking system, which serves to determine a position of at least one observer present in front of the 3D image display 100 and deliver position information data of the observer to the controller 400. The observer position tracking system may be in any form capable of tracking a 3D position of an observer using a method of tracking pupils of the observer, or so on.

From the glassesless-type 3D image display 100, the controller 400 receives display information on a size and resolution of the display panel 110, a width p of a unit pixel, a width M of an electrode between respective unit pixels, a distance d between the parallax barrier 120 (or the lenticular lens sheet) and the display panel 110, an aperture width A (or a width of each semicylindrical lenticular lens), and a width B of a barrier, and also view information on a total number of predetermined views, the number of point light sources per unit pixel, a viewing distance V between the parallax barrier 120 (or the lenticular lens sheet) and the observing plane, and a distance (B.D) between viewing zone centers of respective view images formed on the observing plane. The controller 400 serves to calculate an extended intensity distribution of light emitted from respective point light sources and reaching respective views in an observing area extended in an x direction of a horizontal axis and in a z direction of a vertical axis with respect to the observing plane through apertures (or respective semicylindrical lenticular lenses), and obtain intensity distribution data in horizontal and vertical observing ranges from the predetermined observing plane using the extended intensity distribution.

Also, the controller 400 serves to obtain an optimal viewing area image having quantities of light according to respective views with respect to horizontal and vertical directions of the display panel 110 using the obtained intensity distribution data, synthesize the 3D image and position information data of the observer 10 obtained from the 3D image obtainer 300 with the optimal viewing area image, and display the synthesized image on the display panel 110 such that the observer 10 can visually know an optimal viewing area. Alternatively, the controller 400 may synthesize position information data of an observer received from the observer position tracking system with the optimal viewing area image and display the synthesized image on the display panel 110 such that the observer 10 can visually know the optimal viewing area.

When the 3D position information on the observer 10 obtained from the 3D image obtainer 300 does not correspond to the optimal viewing area, the controller 400 may control the display panel 110 to display optimal view position guide information such that the observer 10 can move to a position in the optimal viewing area (see FIG. 9).

Also, when it is determined using the 3D position information data of the observer 10 obtained from the 3D image obtainer 300 that the observer 10 has left a central area of the display panel 110, the controller 400 may rotate a monitor, that is, the glassesless-type 3D image display 100 or the camera 200, to the left or right using a rotation means such that the observer 10 can reenter in the central area of the display panel 110. Then, the observer 10 may clearly and accurately see a 3D image displayed on the glassesless-type 3D image display 100.

Since the rotation means for rotating the glassesless-type 3D image display 100 or the camera 200 to the left or right can be easily implemented by those of ordinary skill in the art using, for example, a motor and a plurality of gears, a detailed description thereof will be omitted.

The 3D display system configured as described above according to an exemplary embodiment of the present invention receives information on a size and resolution of a display, a viewing distance, views, a distance between both eyes, etc., and calculates the ideal number of barriers and apertures (or the number of semicylindrical lenticular lenses), the quantity of light, a crosstalk, and an intensity distribution. By comparing the calculated results with actual experiment and observation results, it is possible to extract optimal parameters for reducing crosstalk of 3D display, and simulate the optimal parameters using 3D displays having various forms and sizes before commercialization. In this way, the quality of a product can be improved, and a high-quality product capable of minimizing the influence of crosstalk on a user can be developed.

An operation principle of a 3D display System according to an exemplary embodiment of the present invention will be described in detail below. A description made below will center on a 3D display system employing the parallax barrier 120, but the present invention is not limited thereto. The same effects can also be obtained using the lenticular lens sheet.

A glassesless-type 3D display system that forms a viewing zone on the basis of a parallax barrier has a structure and characteristics as described below. A view image provided by a display is a combination of unit pixel images. The number of view images is defined as a resolution obtained by dividing the overall resolution of the display by the number of views, and all the view images have the same number of unit pixels.

Restraints on forming a viewing zone of the corresponding view image are associated with a width of unit pixels shown on the display, an aperture width of a parallax barrier panel, which is viewing zone-forming optical system, a viewing distance, and a position of the parallax barrier panel spaced apart from a display plane. Unit pixels may be represented as a continuous bundle of rays having a divergence angle of $P_i$ with respect to the horizontal direction and uniform density.

Thus, rays emitted from an outermost position of a unit pixel width need to pass through an outermost aperture width of the parallax barrier panel and converge on one point on an observing plane such that rays emitted from unit pixels can converge on the center of a viewing zone. The position of the point is a view position of the corresponding view image, results in an optimal viewing distance, and indicates the center of the corresponding viewing area.

Meanwhile, in terms of geometry, the aperture width of the parallax barrier panel needs to be smaller than the unit pixel width, and the position of the parallax barrier panel is defined as a function proportional to the viewing distance, the unit pixel width, and the aperture width of the parallax barrier panel. When such a process is performed on all view images, characteristics of viewing zones formed at the optimal viewing distance are as follows.

First, viewing zone centers of view images adjacent to each other on the observing plane are at the same intervals. Second, an intensity distribution does not vary. Third, respective viewing zones are successively formed in the horizontal direction. However, rays of point light sources in unit pixels passing through the aperture width of the parallax barrier panel do not converge on one point but have a predetermined distribution at the optimal viewing distance. The width of this distribution is defined as an intensity distribution, and overlap between adjacent intensity distributions is referred to as crosstalk.

Such crosstalk denotes a phenomenon in which an adjacent view image is seen together with the corresponding view image because an observer has left the corresponding view position, causing a double image and deterioration in stereovision. Thus, even if an optimal observing position is designed, it is possible to see the corresponding view image comparatively clearly only in a predetermined range of a direction between the display plane and the observer (the vertical direction) or the horizontal direction. For this reason, an area in which crosstalk is minimized is defined as an optimal viewing area.

The optimal viewing area may be visualized through simulation. In a simulation method, an optimal observing plane is defined on the basis of display factors, and an intensity distribution is shown in predetermined ranges of display and observer directions with respect to the optimal observing plane. This intensity distribution is defined as an extended intensity distribution. The extended intensity distribution intuitively visualizes the optimal viewing area.

Thus, it is possible to comparatively easily and intuitively understand an observing position of the minimum crosstalk. In previously reported research, quantitative and qualitative analysis has been performed on characteristics of the optimal viewing area, but was merely utilized as a theoretical guideline. In other words, discussions on practical utilization have been inadequate. Thus, the present invention proposes a system that controls a change of major variables and observing factors of a glassesless-type 3D display in real time, reflects the change in the definition of an optimal viewing area formed in an observing space, and thereby can control an optimal stereovision environment in real time.

In a method of implementing the proposed system, display/observer factors associated with forming stereovision are defined, and a 3D image and position information on an observer are synthesized and displayed with an optimal viewing area in which the factors are reflected in real time. Since an optimal viewing area image is synthesized and displayed with an image of an actual observing space obtained through a camera on a display panel, the observer is induced to actively move to an optimal view position and can see a clear stereovision image.

Figure 4:
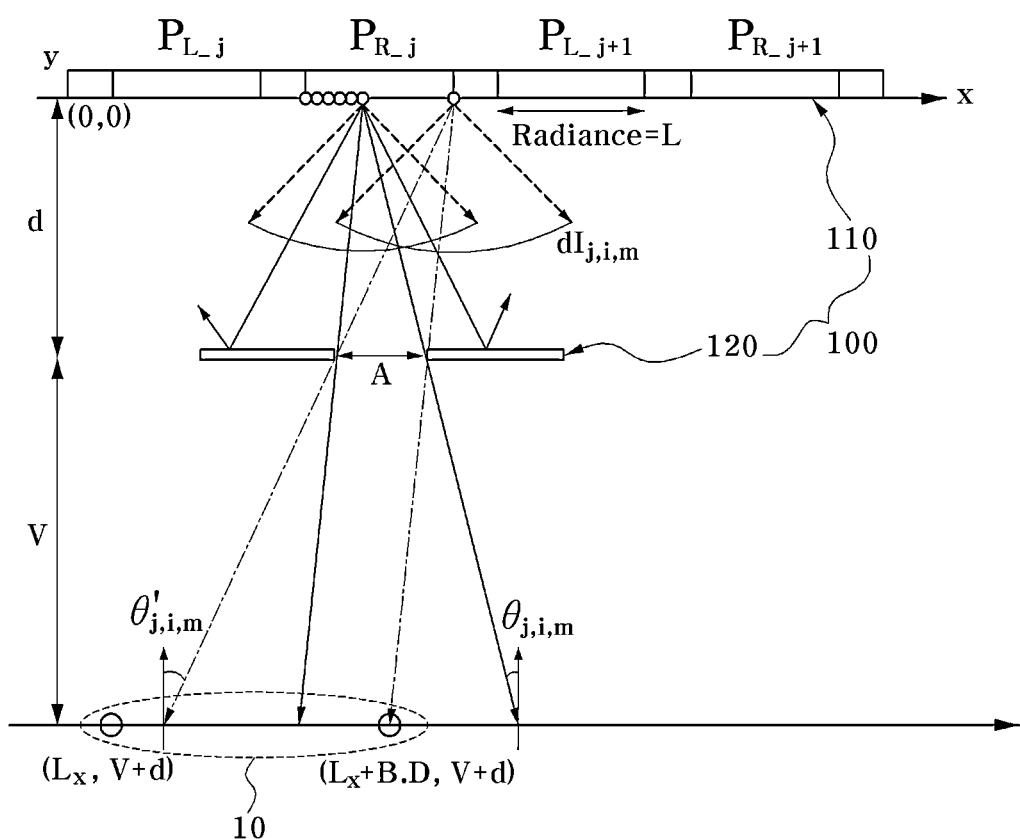
FIG. 4 illustrates a position calculation method for calculating energy distribution at respective views in a 3D display system according to an exemplary embodiment of the present invention.
Figure 5:
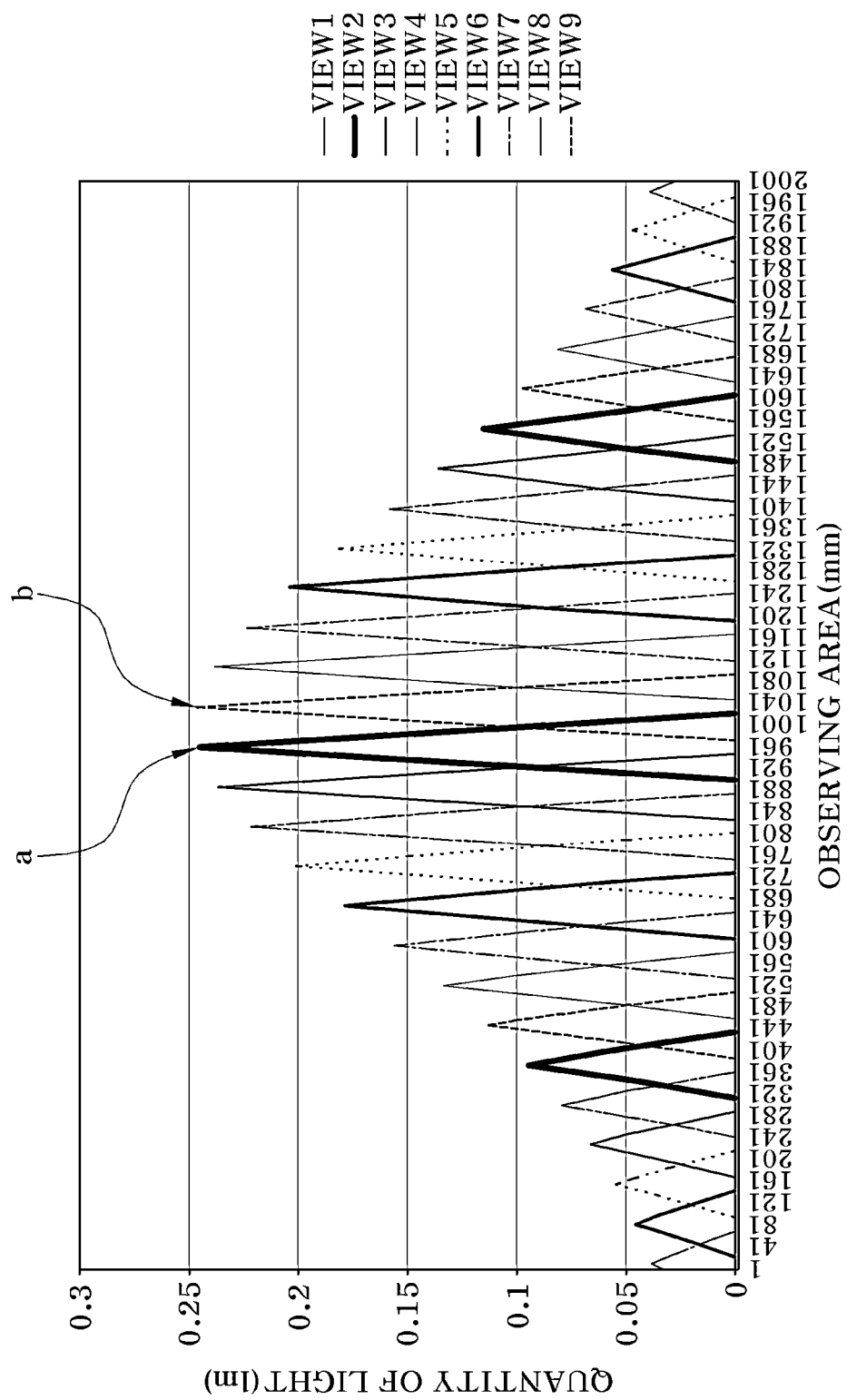
FIG. 5 is a graph illustrating the quantity of light and crosstalk between respective views using a 3D display system according to an exemplary embodiment of the present invention.
Figure 6:
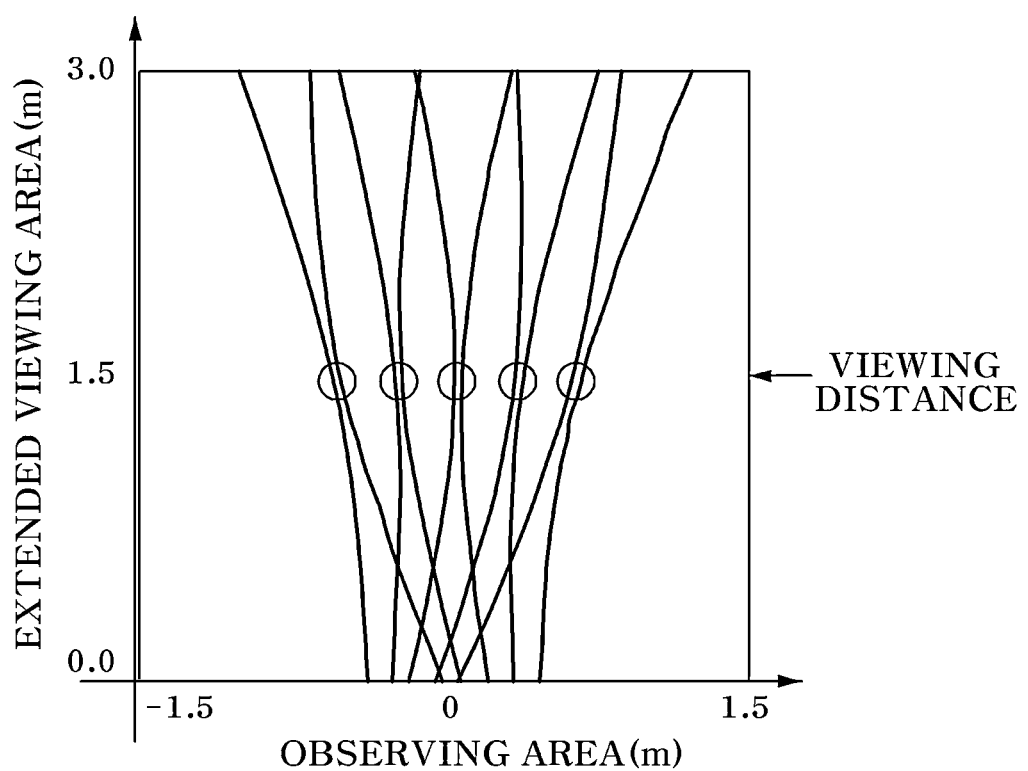
FIG. 6 illustrates an extended intensity distribution reaching respective views in an observing area extended in an x direction of a horizontal axis and in a z direction of a vertical axis with respect to an observing plane in the form of a graph using a 3D display system according to an exemplary embodiment of the present invention.

FIGS. 3A and 3B illustrate a principle of implementing a 3D image using a 3D display system according to an exemplary embodiment of the present invention. FIG. 4 illustrates a position calculation method for calculating energy distribution at respective views in a 3D display system according to an exemplary embodiment of the present invention. FIG. 5 is a graph illustrating the quantity of light and crosstalk between respective views using a 3D display system according to an exemplary embodiment of the present invention. FIG. 6 illustrates an extended intensity distribution reaching respective views in an observing area extended in an x direction of a horizontal axis and in a z direction of a vertical axis with respect to an observing plane in the form of a graph using a 3D display system according to an exemplary embodiment of the present invention.

Referring to FIGS. 3 to 6, restraints on a glassesless-type 3D display employing a parallax barrier will be described first. In a structure of a glassesless-type 3D display system that forms a viewing zone on the basis of a parallax barrier, restraints on forming viewing zones of view images are associated with a width p of unit pixels in a display panel, that is, a display, an aperture width A of a viewing zone-forming optical system, that is, a parallax barrier panel, a viewing distance V, and a distance d between a display plane and the parallax barrier panel.

The parallax barrier is disposed within a distance (V+d) between the display plane and an observing plane, and disposed at the distance d from the display plane. Here, d satisfies Equation 1 below, and B.D denotes a distance between viewing zone centers of respective view images formed on the observing plane.

$$d = \frac{V \cdot p}{B \cdot D} \quad \text{[Equation 1]}$$

Also, the aperture width A of the parallax barrier panel is defined according to Equation 2 below, and a width B of a barrier satisfies Equation 3 below.

$$A = \frac{V \cdot p}{V + d} \quad \text{[Equation 2]}$$

$$B = \frac{V \cdot p(n-1)}{(V+d)} \quad \text{[Equation 3]}$$

Here, n (=1, 2, 3, . . . ) denotes the maximum number of views.

Next, restraints on forming a viewing zone of the corresponding view formed on the observing plane will be described. Unit pixel images of each view image passing through apertures of the parallax barrier panel form each viewing zone at the viewing distance (V+d).

As a bundle of rays of uniform density emitted from positions of point light sources of infinitesimal areas constituting unit pixels of the display, only rays passing through apertures of the parallax barrier panel are mentioned. Here, a point P(x) of a point light source of an infinitesimal area constituting a unit pixel may be represented as a coordinate in the x direction of the horizontal axis. Rays emitted from P(x) correspond to a viewing zone coordinate ($X_{P(x)}$) for forming a viewing zone and a brightness ($I_{P(x)}$) of light at the viewing distance (V+d).

Here, the viewing zone coordinate ($X_{P(x)}$) satisfies Equation 4 below.

$$X_{P(x)} = \frac{(V+d)(A-P(x))}{d} - P(x) \quad \text{[Equation 4]}$$

A mathematical relation of Equation 4 is a straight line equation, which is dependent on the distance V from the parallax barrier panel to the observing plane and the distance d between the display plane and the parallax barrier panel.

The brightness ($I_{P(x)}$) of light at the viewing zone coordinate ($X_{P(x)}$) satisfies Equation 5 below. In other words, the brightness ($I_{P(x)}$) of light at the viewing zone coordinate ($X_{P(x)}$) is proportional to the square of a distance between a position of the corresponding unit pixel image and the viewing zone coordinate ($X_{P(x)}$) on the observing plane and inversely proportional to the square of the cosine of an angle $$\tan^{-1}\left[\frac{X_{P(x)}}{V+d}\right]$$

with respect to a normal direction to the display plane.

$$I_{P(x)} = L \frac{(P(x)) \cdot \cos^2\left[\tan^{-1}\left[\frac{X_{P(x)}}{V+d}\right]\right]}{(V+d)^2 + X_{P(x)}^2} \quad \text{[Equation 5]}$$

Here, L denotes an initial brightness value of the point light source. The greater the value of the viewing zone coordinate ($X_{P(x)}$), the less the brightness ($I_{P(x)}$).

Next, restraints on forming an intensity distribution in a horizontal observing range will be described. An optimal viewing zone is formed at the distance (V+d) from the display plane to the observing plane. A brightness distribution in a range of the formed viewing zone may be represented as an accumulation of brightness values for viewing zone coordinate values, and a brightness distribution, that is, intensity distribution, of all view images in the horizontal direction on the observing plane (V+d) is defined as Equation 6 below.

$$\text{Intensity distribution} = \sum_n \sum_{OV_{min}}^{OV_{max}} \{X_{P(x)}, I_{P(x)}\} \quad \text{[Equation 6]}$$

Here, $OV_{min}$ and $OV_{max}$ denote the maximum and minimum of an observing range in the x direction of the horizontal axis. The observing range indicates a position of an observer and a movement range.

$$n\left(\sum_n\right)$$

denotes a repetition row accumulated beginning with 1 and ending with the number of all views, consequently indicating an intensity distribution in a horizontal observing range.

Such an intensity distribution denotes brightness of light at n views on an observing area axis, that is, the sum of quantities of light emitted from respective pixels on the display panel and coming through apertures of the parallax barrier panel.

Next, restraints on forming of an intensity distribution in a vertical observing range will be described. An intensity distribution in a horizontal observing range is an ideal brightness distribution in one dimension of the horizontal axis. Thus, a range of an observer position for observing a clear stereo image is limited in the z direction of the vertical axis. To solve this problem, the range needs to be extended in a display direction (z+) and the opposite direction (−z) with respect to the designed optimal observing plane (V+d). Here, extended areas are indicated by add+ and add−, and an extended intensity distribution to which these areas are applied is defined according to Equation 7 below. Thus, an intensity distribution extended in the z-axis direction may provide a 2D position of an observer and quantitative viewing zone information on movement.

$$\text{Extended intensity distribution} = \sum_{add^-}^{add^+} \sum_n \sum_{OV_{min}}^{OV_{max}} \{X_{P(x)}, I_{P(x)}\} \quad \text{[Equation 7]}$$

In this way, the extended intensity distribution denotes brightness of light at n views in the observing area, that is, the sum of quantities of light emitted from the respective pixels on the display panel and coming through apertures of the parallax barrier panel.

If a lenticular lens sheet is used instead of a parallax barrier, assuming that lenslets of the lenticular lenses are thin lenses, V denotes a viewing distance between a principal plane of the lenticular lenslets and the observing plane and is substitutable with an image distance $S_i$. Further, d denotes a distance between the principal plane of the lenticular lenslets and the display panel and is substitutable with an object distance $S_o = (f^*S_i)/(S_i - f)$ (where f is a focal length of the lenslets). A denotes a width of each semicylindrical lenticular lens of the lenticular lens sheet and is substitutable with a period pitch = $(S_i^*n^*P)/(S_o - S_i)$ (where n is a total number of views). L denotes an initial brightness value of the point light source.

As a result, an intensity distribution and an extended intensity distribution are generated as images, synthesized with an actual observing area image obtained through a camera, and displayed on a display panel, such that at least one observer can actively move to an optimal stereo viewing area and effectively view provided stereo content.

Meanwhile, FIG. 4 illustrates a basic concept for calculating the quantity of light at a designated view. Assuming each pixel as n point light sources to facilitate calculation, an overall intensity distribution of light emitted from respective point light sources and reaching respective views through apertures of the parallax barrier panel is calculated.

FIG. 5 is a graph showing the results of simulating the quantity of light and crosstalk between respective views using a 3D display system according to an exemplary embodiment of the present invention, in which the quantity of light and the amount and frequency of crosstalk are shown according to respective views. Here, respective parameters are as follows. The total number of views set in the experiment was set to 9, the number of point light sources per pixel was set to 100, the resolution of a 3D display was set to 1920, the size of the display was set to 762, the size of a subpixel was set to 0.13 mm, the length of an electrode was set to 0.01 mm, a viewing distance was set to 80 cm, and a distance between both eyes was set to 65 mm.

In FIG. 5, the experimental results show areas where crosstalk occurs in respective views and the amount of the crosstalk. An arrow a indicates the brightest portion of an image corresponding to a second view, and an arrow b indicates the brightest portion of the image corresponding to a third view. In other words, it is possible to say that the second view and the third view having the greatest quantity of light in the center of the display are shown best.

FIG. 6 is a graph showing the results of calculating and simulating an extended intensity distribution reaching respective views in an observing area extended in an x direction of a horizontal axis and in a z direction of a vertical axis with respect to an observing plane using a 3D display system according to an exemplary embodiment of the present invention, in which it is possible to visually know a position where the corresponding view is brightest, an area where crosstalk occurs, and so on.

Referring to FIG. 6, from the results of setting display parameters to make an optimal viewing distance 1.5 m and performing a simulation, it is possible to see that light is collected best at the optimal viewing distance of 1.5 m. This position is an optimal viewing position.

Meanwhile, the horizontal axis denotes an observing area, that is, a distance from the center of a display to the left and right, in which a position of 0 is the center of the display. Also, the vertical axis denotes an extended viewing area, that is, a distance from the center of the display to an observer.

Figure 7:
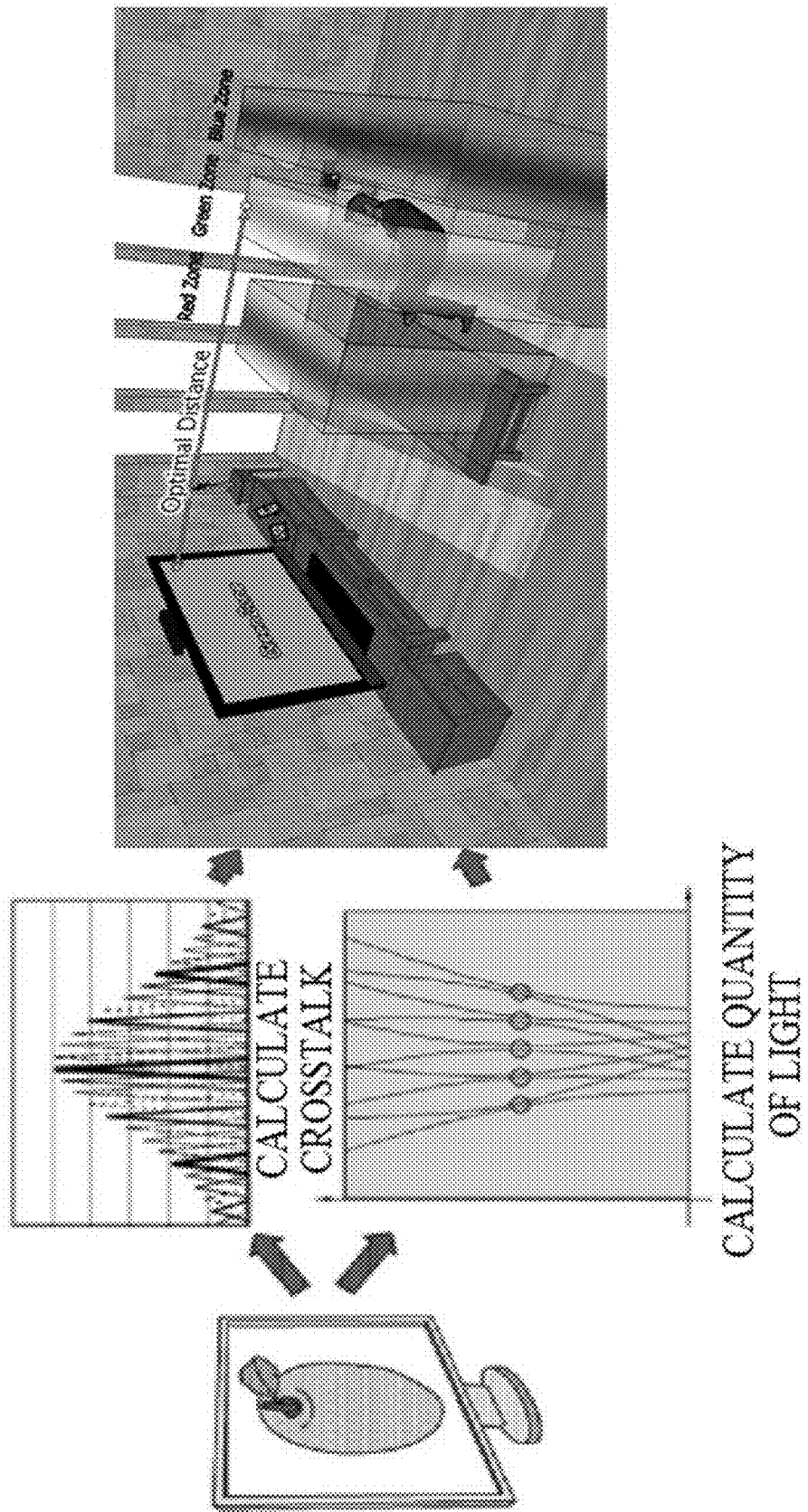
FIG. 7 is a conceptual diagram of a process in which a 3D display system according to an exemplary embodiment of the present invention calculates an extended intensity distribution reaching respective views in an observing area extended in an x direction of a horizontal axis and in a z direction of a vertical axis with respect to an observing plane in addition to the quantity of light and crosstalk between the respective views, and displays an optimal viewing area image.

FIG. 7 is a conceptual diagram of a process in which a 3D display system according to an exemplary embodiment of the present invention calculates an extended intensity distribution reaching respective views in an observing area extended in an x direction of a horizontal axis and in a z direction of a vertical axis with respect to an observing plane in addition to the quantity of light and crosstalk between the respective views, and displays an optimal viewing area image.

As shown in FIG. 7, an optimal viewing area may be indicated by a color. When the optimal viewing area is indicated by, for example, green, an area in front of the optimal viewing area may be indicated by red and an area behind the optimal viewing area may be indicated by blue, such that the areas can be distinguished.

Figure 8A:
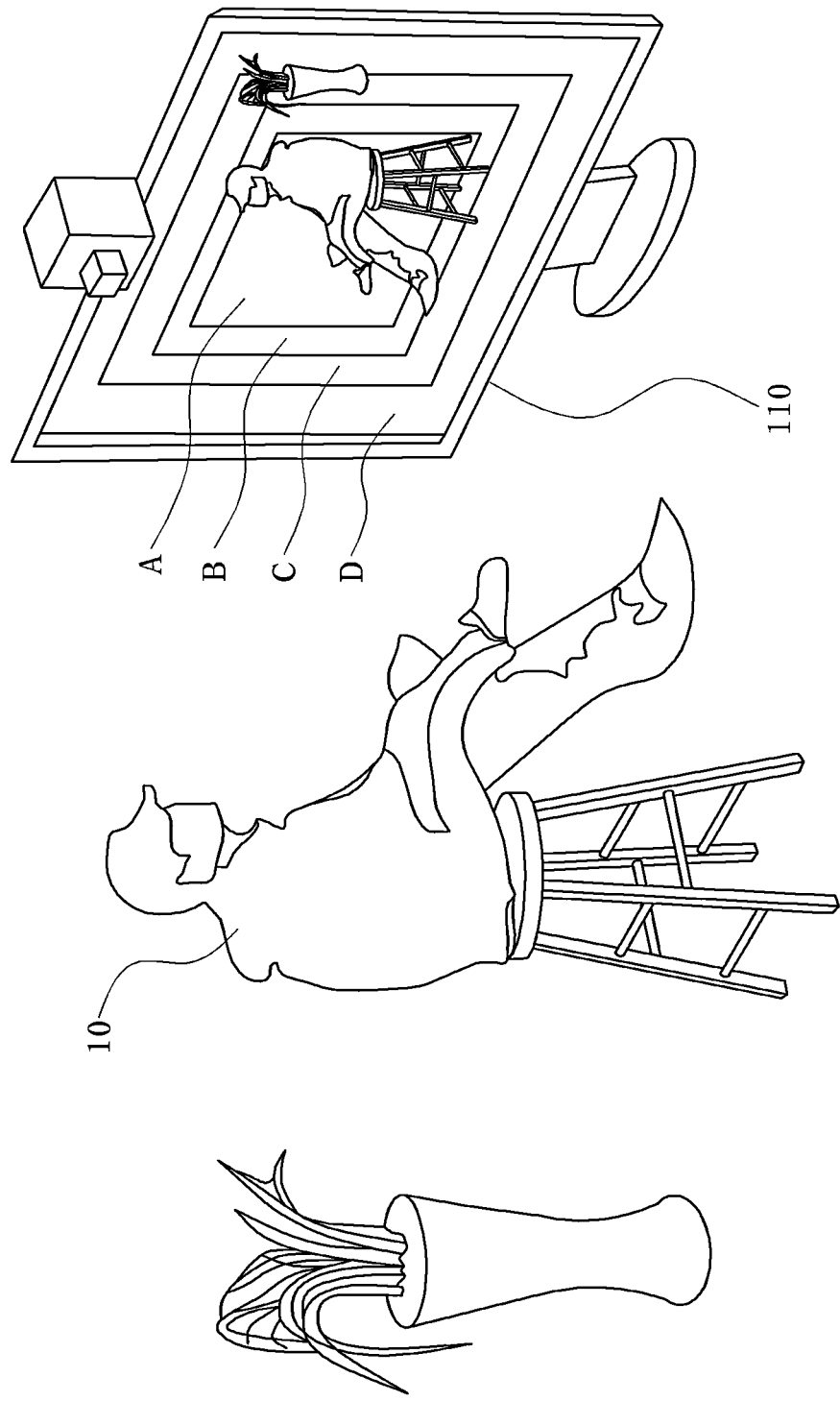
FIG. 8A shows a situation in which a 3D display system according to an exemplary embodiment of the present invention synthesizes a 3D image and position information data of an observer with an obtained optimal viewing area image and displays the synthesized image on a display panel.
Figure 8B:
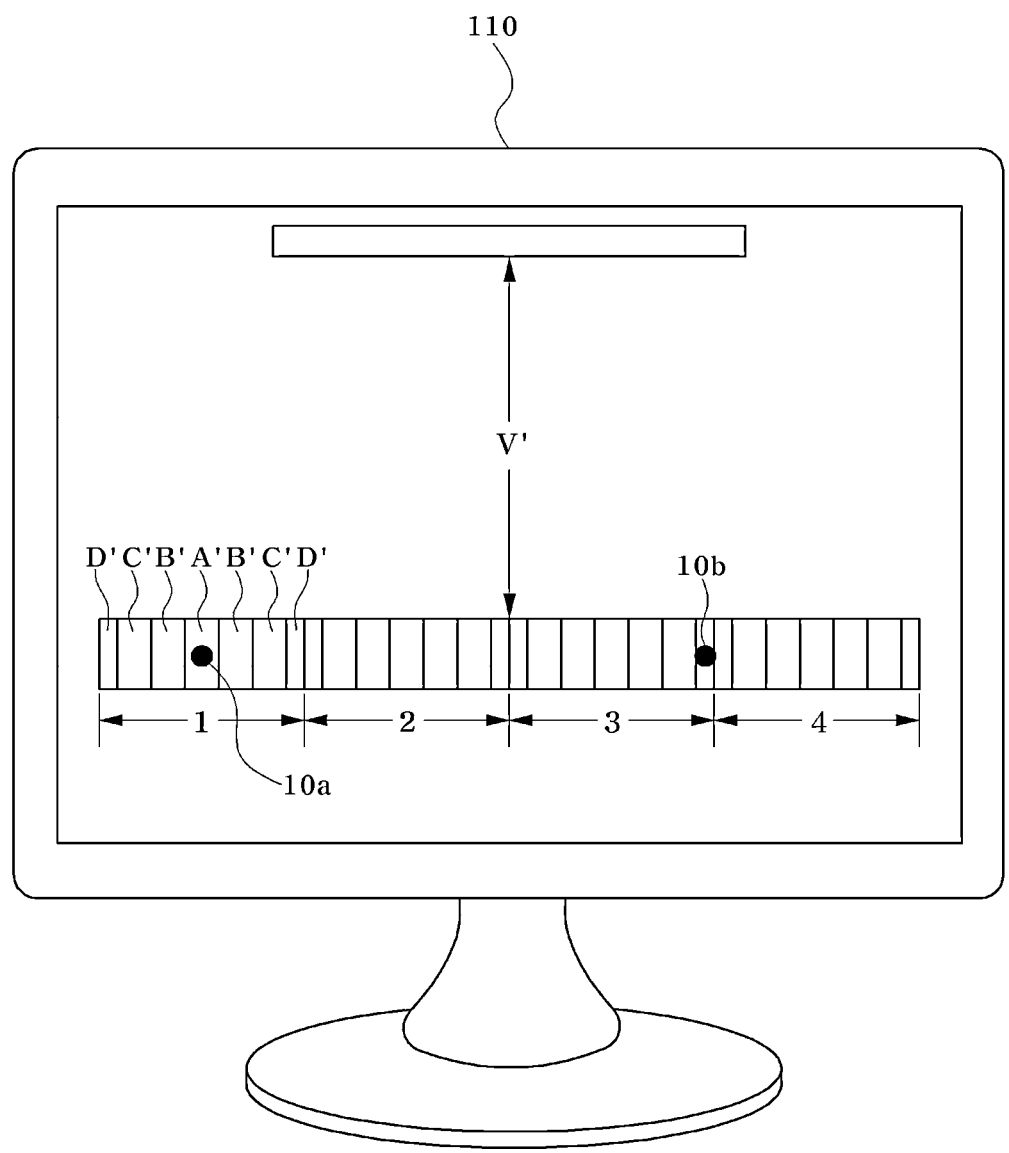
FIG. 8B shows an optimal viewing area image obtained and displayed on a display panel by a 3D display system according to another exemplary embodiment of the present invention.

FIG. 8A shows a situation in which a 3D display system according to an exemplary embodiment of the present invention synthesizes a 3D image and position information data of an observer with an obtained optimal viewing area image and displays the synthesized image on a display panel, and FIG. 8B shows an optimal viewing area image obtained and displayed on a display panel by a 3D display system according to another exemplary embodiment of the present invention. In the case of FIG. 8A or 8B, at least one observer may see the display panel and easily determine whether he/she is currently in an optimal viewing area.

Specifically, in FIG. 8A, a first area A displayed on a display panel 110 is an optimal viewing area in which a 3D image is shown best, and the 3D image is shown gradually worse from a second area B to a fourth area to D. Thus, it is possible to easily know that an observer 10 displayed on the display panel 110 is in the first area A, the optimal viewing area in which a 3D image is shown best.

In FIG. 8B, view-specific optimal viewing areas 1 to 4 at an optimal viewing distance V' are displayed on a display panel 110. A central area of the view-specific optimal viewing areas 1 to 4, that is, the first area A', is an optimal viewing area in which a 3D image is shown best, and the 3D image is shown gradually worse from a second area B' to a fourth area D' in both directions from the first area A'.

Thus, it is possible to easily know that a first observer 10a displayed on the display panel 110 is in the first area A', in which a 3D image is shown best, within the optimal viewing area 1 of a first view, and a second observer 10b is in the fourth area D', in which a 3D image is shown worst, within the optimal viewing area 3 of a third view.

Figure 9A:
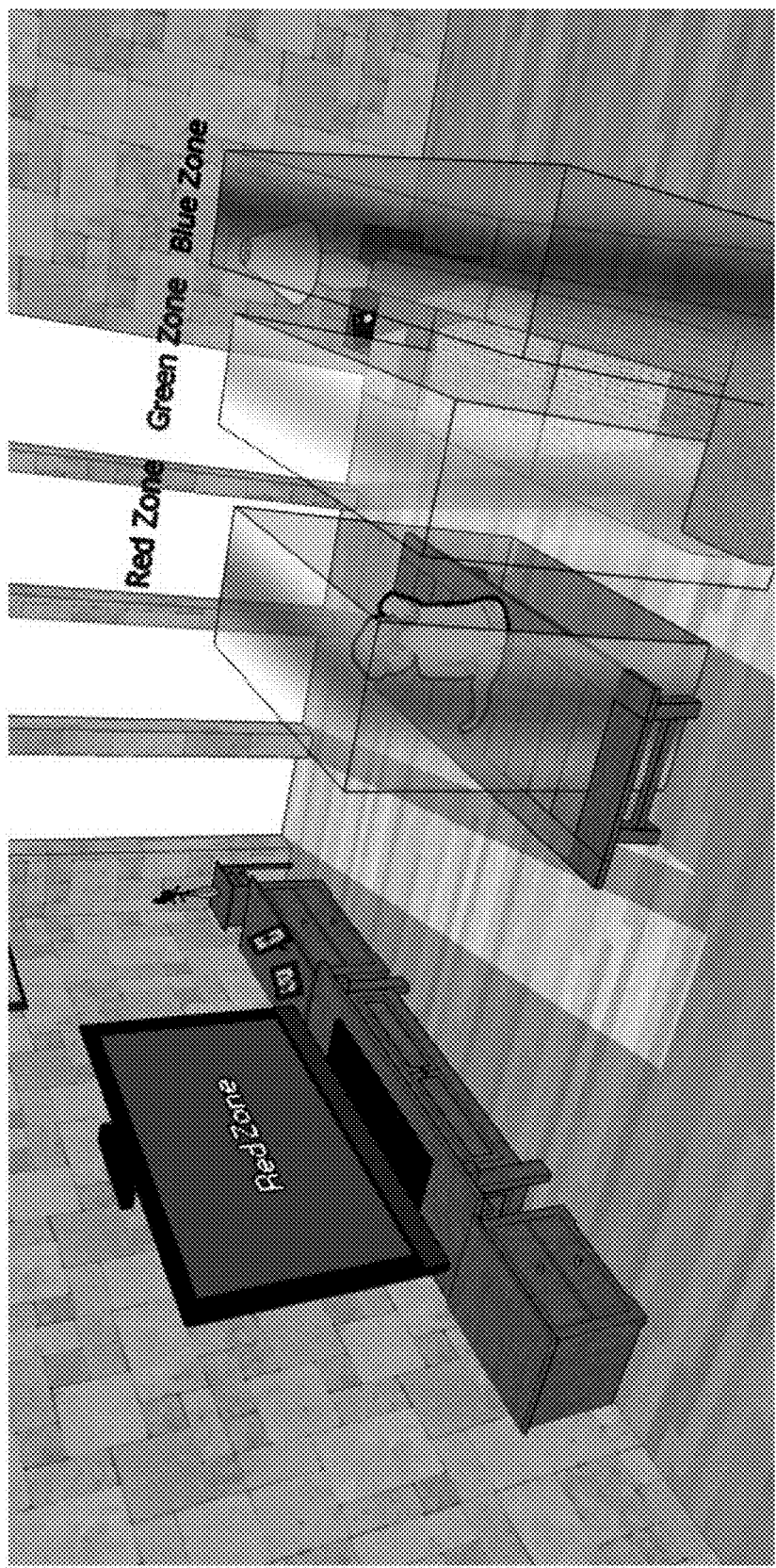
Figure 9C:
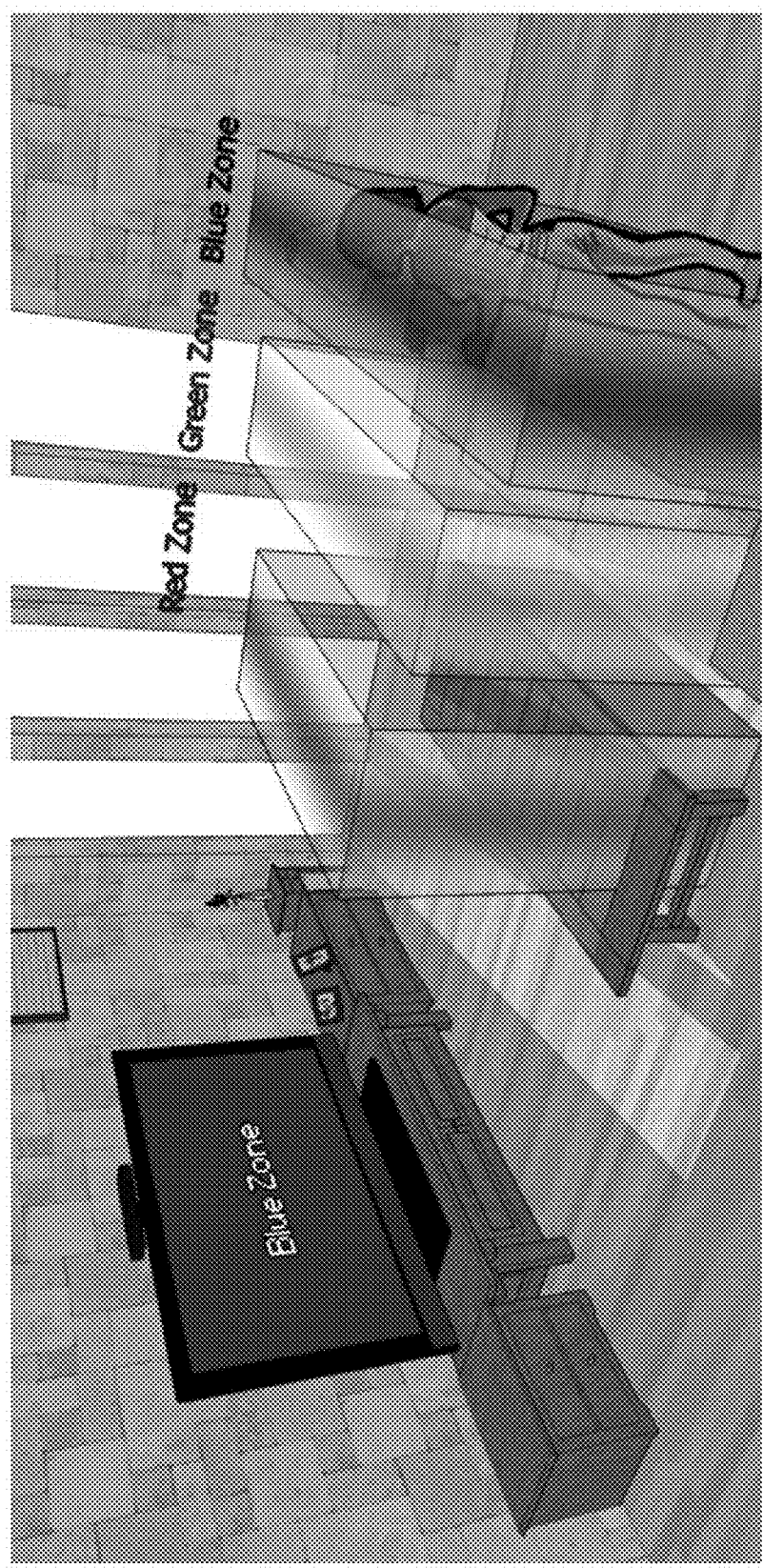

FIGS. 9A to 9C show examples in which a 3D display system according to an exemplary embodiment of the present invention divides an obtained viewing area into color areas in a z direction of a vertical axis and displays the corresponding areas to observers.

Referring to FIG. 9B, an observer is in an optimal viewing area, and the 3D display system may display green on a screen. When the observer leaves the optimal viewing area, the 3D display system may display red or blue to indicate that the observer is out of the optimal viewing area as shown in FIGS. 9A and 9C.

Figure 10:
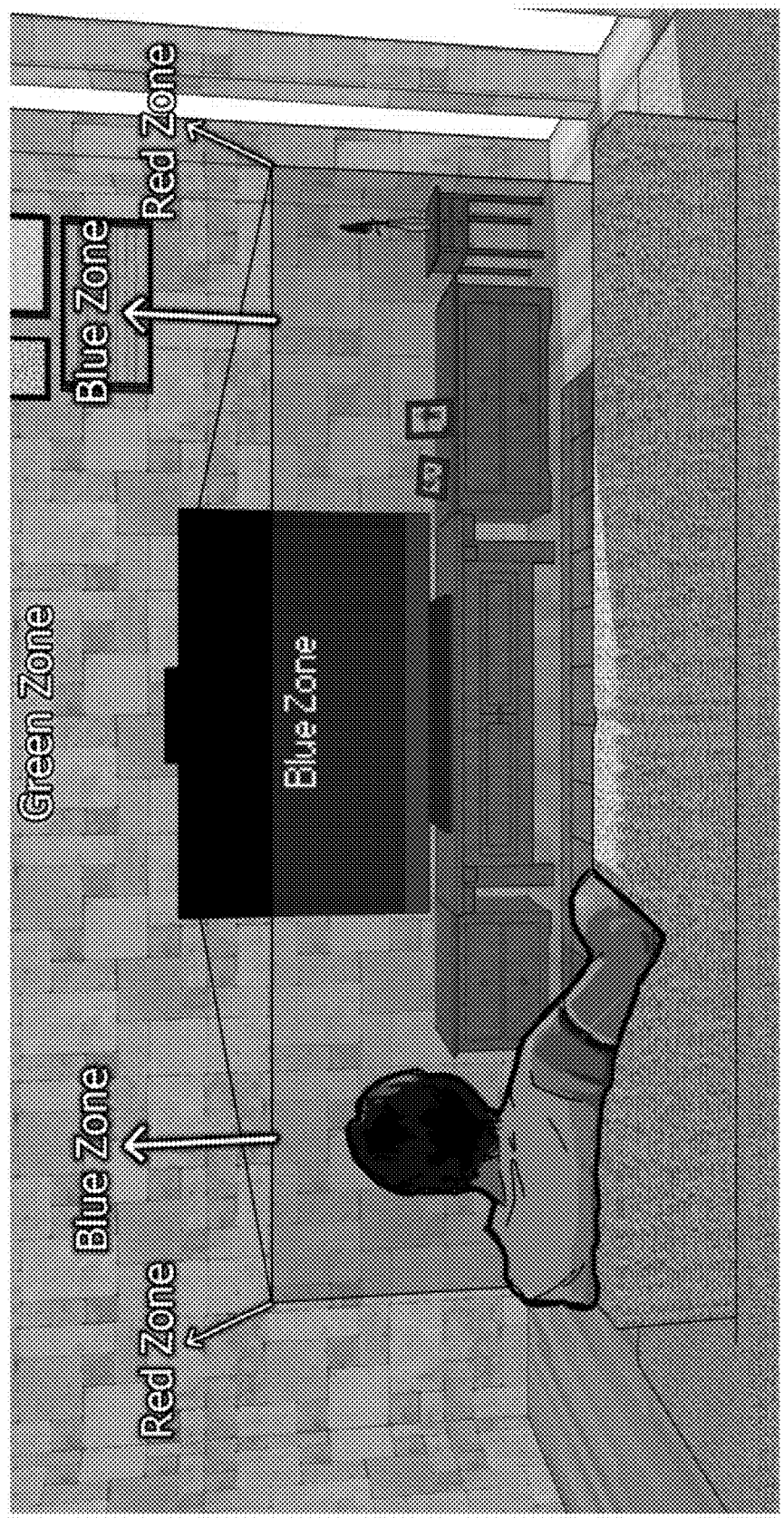
FIG. 10 shows an example in which a 3D display system according to an exemplary embodiment of the present invention divides an obtained viewing area into color areas in an x direction of a horizontal axis and displays the corresponding area to an observer.

FIG. 10 shows an example in which a 3D display system according to an exemplary embodiment of the present invention divides an obtained viewing area into color areas in an x direction of a horizontal axis and displays the corresponding area to an observer.

Referring to FIG. 10, if an observer were in an optimal viewing area, the center of the viewing area, green would be shown on a screen. However, the observer is currently to the side of the optimal viewing area, and thus blue is shown.

Consequently, an observer can determine whether or not he or she is in an optimal viewing area with reference to the screens shown in FIGS. 8 to 10 by way of example, and easily move to the optimal viewing area with reference to the screens displaying colors.

The above-described 3D display system according to exemplary embodiments of the present invention synthesizes a 3D image and position information data of an observer obtained through a camera with an optimal viewing area image with respect to horizontal and vertical directions of a display panel in a 3D space, and displays the synthesized image on the display panel such that the observer can visually know an optimal viewing area. Thus, at least one observer can readily check an optimal viewing area, and is induced to move to a position in the optimal viewing area. Also, respective parameters of a 3D display may be adjusted to minimize crosstalk, such that an optimized glassesless-type 3D display can be designed.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A three-dimensional (3D) display system, comprising:
a glassesless-type 3D image display in which a parallax barrier including apertures is disposed in front of a display panel;
a camera configured to obtain background image information on a observing area including at least one observer present in front of the 3D image display;
a 3D image obtainer configured to receive the obtained background image information from the camera and to obtain a 3D image and position information data of the at least one observer using stereo matching; and
a controller configured to calculate an extended intensity distribution of light emitted from light sources of the glassesless-type 3D image display and reaching views in an observing area extended in an x-direction of a horizontal axis and in a z-direction of a vertical axis with respect to an observing plane, to obtain intensity distribution data in horizontal and vertical observing ranges from the observing plane, to obtain an optimal viewing area image having quantities of light according to respective views in horizontal and vertical directions of the display panel using the intensity distribution data, to synthesize the 3D image and position information data of the at least one observer obtained from the 3D image obtainer with the optimal viewing area image, and to display the synthesized image on the display panel such that the at least one observer visually knows an optimal viewing area,
wherein when the 3D position information data of the at least one observer obtained from the 3D image obtainer does not correspond to the optimal viewing area, the controller controls the display panel to display optimal view position guide information such that the at least one observer moves to a position in the optimal viewing are.

2. The 3D display system of claim 1, wherein the extended intensity distribution is calculated using Equation 1 below:

$$\text{Extended intensity distribution} = \sum_{add^-}^{add^+} \sum_{n} \sum_{OV_{min}}^{OV_{max}} \{X_{P(x)}, I_{P(x)}\} \qquad [\text{Equation 1}]$$

where $$n(\sum_{n})$$

denotes a repetition row accumulated beginning with 1 and ending with the number of all views, $OV_{min}$ and $OV_{max}$ denote a minimum and maximum of an observing range in the x-direction of the horizontal axis, P(x) denotes a position of a point light source of an infinitesimal area constituting a unit pixel and is represented as a coordinate in the x-direction of the horizontal axis, $X_{P(x)}$ denotes a position (viewing zone coordinates) of P(x) reaching the observing plane, $I_{P(x)}$ denotes brightness of light reaching the viewing zone coordinates on the observing plane, rays emitted from P(x) correspond to the viewing zone coordinates $X_{P(x)}$ for forming a viewing zone and the brightness $I_{P(x)}$ of $X_{P(x)}$ at a distance of (V+d) from the display panel to the observing plane, and add+ and add− denote extended areas in z+ and z− directions of the vertical axis with respect to the observing plane (V+d).

3. The 3D display system of claim 2, wherein the viewing zone coordinates $X_{P(x)}$ and the brightness $I_{P(x)}$ of $X_{P(x)}$ are calculated using Equation 2 below:

$$X_{P(x)} = \frac{(V+d)(A-P(x))}{d} - P(x) \quad \text{[Equation 2]}$$

$$I_{P(x)} = L \frac{(P(x)) \cdot \cos^2\left[\tan^{-1}\left[\frac{X_{P(x)}}{V+d}\right]\right]}{(V+d)^2 + X_{P(x)}^2}$$

where V denotes a viewing distance between the parallax barrier and the observing plane, d denotes a distance between the parallax barrier and the display panel, A denotes an aperture width of the parallax barrier, and L denotes an initial brightness value of the point light source.

4. The 3D display system of claim 1, wherein, when it is determined using the 3D position information data of the at least one observer obtained from the 3D image obtainer that the at least one observer has left a central area of the display panel, the controller rotates the glassesless-type 3D image display or the camera using a rotation means such that the at least one observer reenters in the central area of the display panel.

5. The 3D display system of claim 1, wherein the at least one observer comprises a plurality of observers.

6. A three-dimensional (3D) display system, comprising:
a glassesless-type 3D image display in which a lenticular lens sheet formed by arranging lenticular lenses in the form of an array is disposed in front of a display panel;
a camera configured to obtain background image information on an observing area including at least one observer present in front of the 3D image display;
a 3D image obtainer configured to receive the obtained background image information from the camera and to obtain a 3D image and position information data of the at least one observer using stereo matching; and
a controller configured to calculate an extended intensity distribution of light emitted from light sources of the glassesless-type 3D image display and reaching views in an observing area extended in an x-direction of a horizontal axis and in a z-direction of a vertical axis with respect to an observing plane, to obtain intensity distribution data in horizontal and vertical observing ranges from the observing plane, to obtain an optimal viewing area image having quantities of light according to respective views in horizontal and vertical directions of the display panel using the intensity distribution data, to synthesize the 3D image and position information data of the at least one observer obtained from the 3D image obtainer with the optimal viewing area image, and to display the synthesized image on the display panel such that the at least one observer visually knows an optimal viewing area,
wherein when the 3D position information data of the at least one observer obtained from the 3D image obtainer does not correspond to the optimal viewing area, the controller controls the display panel to display optimal view position guide information such that the at least one observer moves to a position in the optimal viewing area.

7. The 3D display system of claim 6, wherein the extended intensity distribution is calculated using Equation 3 below:

$$\text{Extended intensity distribution} = \sum_{add^-}^{add^+} \sum_{n} \sum_{OV_{min}}^{OV_{max}} \{X_{P(x)}, I_{P(x)}\} \quad \text{[Equation 3]}$$

where, $$n\left(\sum_{n}\right)$$

denotes a repetition row accumulated beginning with 1 and ending with the number of all views, $OV_{min}$ and $OV_{max}$ denote a minimum and maximum of an observing range in the x-direction of the horizontal axis, P(x) denotes a position of a point light source of an infinitesimal area constituting a unit pixel and is represented as a coordinate in the x-direction of the horizontal axis, $X_{P(x)}$ denotes a position (viewing zone coordinates) of P(x) reaching the observing plane, $I_{P(x)}$ denotes brightness of light reaching the viewing zone coordinates on the observing plane, rays emitted from P(x) correspond to the viewing zone coordinates $X_{P(x)}$ for forming a viewing zone and the brightness $I_{P(x)}$ of $X_{P(x)}$ at a distance (V+d) from the display panel to the observing plane, and add+ and add− denote extended areas in z+ and z− directions of the vertical axis with respect to the observing plane (V+d).

8. The 3D display system of claim 7, wherein the viewing zone coordinates $X_{P(x)}$ and the brightness $I_{P(x)}$ of $X_{P(x)}$ are calculated using Equation 4 below:

$$X_{P(x)} = \frac{(V+d)(A-P(x))}{d} - P(x) \quad \text{[Equation 4]}$$

$$I_{P(x)} = L \frac{(P(x)) \cdot \cos^2\left[\tan^{-1}\left[\frac{X_{P(x)}}{V+d}\right]\right]}{(V+d)^2 + X_{P(x)}^2}$$

where, V denotes a viewing distance between the lenticular lens sheet and the observing plane, d denotes a distance between the lenticular lens sheet and the display panel, A denotes a width of each semicylindrical lenticular lens of the lenticular lens sheet, and L denotes an initial brightness value of the point light source.

9. The 3D display system of claim 6, wherein, when it is determined using the 3D position information data of the at least one observer obtained from the 3D image obtainer that the at least one observer has left a central area of the display panel, the controller rotates the glassesless-type 3D image display or the camera using a rotation means such that the at least one observer reenters the central area of the display panel.

10. The 3D display system of claim 6, wherein the at least one observer comprises a plurality of observers.

11. A three-dimensional (3D) display system, comprising:
a glassesless-type 3D image display in which a parallax barrier including apertures is disposed in front of a display panel;
an observer position tracking system configured to determine a position of at least one observer present in front of the 3D image display and to deliver position information data of the at least one observer to a controller; and
the controller configured to calculate an extended intensity distribution of light emitted from respective light sources of the glassesless-type 3D image display and reaching respective views in an observing area extended in an x-direction of a horizontal axis and in a z-direction of a vertical axis with respect to an observing plane, to obtain intensity distribution data in horizontal and vertical observing ranges from the observing plane, to obtain an optimal viewing area image having quantities of light according to respective views in horizontal and vertical directions of the display panel using the intensity distribution data, to synthesize the position information data of the at least one observer received from the observer position tracking system with the optimal viewing area image, and to display the synthesized image on the display panel such that the at least one observer visually knows an optimal viewing area,
wherein when the position information data of the at least one observer obtained from the observer position tracking stem does not correspond to the optimal viewing area the controller controls the display panel to display optimal view position guide information such that the at least one observer moves to a position in the optimal viewing area.

12. The 3D display system of claim 11, wherein the extended intensity distribution is calculated using Equation 5 below:

$$\text{Extended intensity distribution} = \sum_{add-}^{add+} \sum_{n} \sum_{OV_{min}}^{OV_{max}} \{X_{P(x)}, I_{P(x)}\} \quad \text{[Equation 5]}$$

where, $$n\left(\sum_{n}\right)$$

denotes a repetition row accumulated beginning with 1 and ending with the number of all views, $OV_{min}$ and $OV_{max}$ denote a minimum and maximum of an observing range in the x-direction of the horizontal axis, P(x) denotes a position of a point light source of an infinitesimal area constituting a unit pixel and is represented as a coordinate in the x-direction of the horizontal axis, $X_{P(x)}$ denotes a position (viewing zone coordinates) of P(x) reaching the observing plane, $I_{P(x)}$ denotes brightness of light reaching the viewing zone coordinates on the observing plane, rays emitted from P(x) correspond to the viewing zone coordinates $X_{P(x)}$ for forming a viewing zone and the brightness $I_{P(x)}$ of $X_{P(x)}$ at a distance (V+d) from the display panel to the observing plane, and add+ and add− denote extended areas in z+ and z− directions of the vertical axis with respect to the observing plane (V+d).

13. The 3D display system of claim 12, wherein the viewing zone coordinates $X_{P(x)}$ and the brightness $I_{P(x)}$ of $X_{P(x)}$ are calculated using Equation 6 below:

$$X_{P(x)} = \frac{(V+d)(A-P(x))}{d} - P(x) \quad \text{[Equation 6]}$$

$$I_{P(x)} = L \frac{(P(x)) \cdot \cos^2\left[\tan^{-1}\left[\frac{X_{P(x)}}{V+d}\right]\right]}{(V+d)^2 + X_{P(x)}^2}$$

where, V denotes a viewing distance between the parallax barrier and the observing plane, d denotes a distance between the parallax barrier and the display panel, A denotes an aperture width of the parallax barrier, and L denotes an initial brightness value of the point light source.

14. The 3D display system of claim 11, wherein, when it is determined using the position information data of the at least one observer obtained from the observer position tracking system that the at least one observer has left a central area of the display panel, the controller rotates the glassesless-type 3D image display using a rotation means such that the at least one observer reenters the central area of the display panel.

15. The 3D display system of claim 11, wherein the at least one observer comprises a plurality of observers.

16. A three-dimensional (3D) display system, comprising:
a glassesless-type 3D image display in which a lenticular lens sheet formed by arranging lenticular lenses in the form of an array is disposed in front of a display panel;
an observer position tracking system configured to determine a position of at least one observer present in front of the 3D image display and to deliver position information data of the at least one observer to a controller; and
the controller configured to calculate an extended intensity distribution of light emitted from light sources of the glassesless-type 3D image display and reaching views in an observing area extended in an x-direction of a horizontal axis and in a z-direction of a vertical axis with respect to an observing plane, to obtain intensity distribution data in horizontal and vertical observing ranges from the observing plane, to obtain an optimal viewing area image having quantities of light according to respective views in horizontal and vertical directions of the display panel using the intensity distribution data, to synthesize the position information data of the at least one observer received from the observer position tracking system with the optimal viewing area image, and to display the synthesized image on the display panel such that the at least one observer visually knows an optimal viewing area,
wherein when the position information data of the at least one observer obtained from the observer position tracking system does not correspond to the optimal viewing area, the controller controls the display panel to display optimal view position guide information such that the at least one observer moves to a position in the optimal viewing area.

17. The 3D display system of claim 16, wherein the extended intensity distribution is calculated using Equation 7 below:

Extended intensity distribution= [Equation 7]

$$\sum_{add-}^{add+} \sum_{n} \sum_{OV_{min}}^{OV_{max}} \{X_{P(x)}, I_{P(x)}\}$$

where, $$n\left(\sum_{n}\right)$$

denotes a repetition row accumulated beginning with 1 and ending with the number of all views, $OV_{min}$ and $OV_{max}$ denote a minimum and maximum of an observing range in the x-direction of the horizontal axis, P(x) denotes a position of a point light source of an infinitesimal area constituting a unit pixel and is represented as a coordinate in the x-direction of the horizontal axis, $X_{P(x)}$ denotes a position (viewing zone coordinates) of P(x) reaching the observing plane, $I_{P(x)}$ denotes brightness of light reaching the viewing zone coordinates on the observing plane, rays emitted from P(x) correspond to the viewing zone coordinates $X_{P(x)}$ for forming a viewing zone and the brightness $I_{P(x)}$ of $X_{P(x)}$ at a distance (V+d) from the display panel to the observing plane, and add+ and add− denote extended areas in z+ and z− directions of the vertical axis with respect to the observing plane (V+d).

18. The 3D display system of claim 17, wherein the viewing zone coordinates $X_{P(x)}$ and the brightness $I_{P(x)}$ of $X_{P(x)}$ are calculated using Equation 8 below:

$$X_{P(x)} = \frac{(V+d)(A-P(x))}{d} - P(x) \quad \text{[Equation 8]}$$

$$I_{P(x)} = L \frac{(P(x)) \cdot \cos^2\left[\tan^{-1}\left[\frac{X_{P(x)}}{V+d}\right]\right]}{(V+d)^2 + X_{P(x)}^2}$$

where, V denotes a viewing distance between the lenticular lens sheet and the observing plane, d denotes a distance between the lenticular lens sheet and the display panel, A denotes a width of each semicylindrical lenticular lens of the lenticular lens sheet, and L denotes an initial brightness value of the point light source.

19. The 3D display system of claim 16, wherein, when it is determined using the position information data of the at least one observer obtained from the observer position tracking system that the at least one observer has left a central area of the display panel, the controller rotates the glassesless-type 3D image display using a rotation means such that the at least one observer reenters the central area of the display panel.

20. The 3D display system of claim 16, wherein the at least one observer comprises a plurality of observers.

\* \* \* \* \*